US011282347B2

(12) United States Patent
Shiraishi

(10) Patent No.: US 11,282,347 B2
(45) **Date of Patent: *Mar. 22, 2022**

(54) GAMING MACHINE, CONTROL METHOD FOR MACHINE, AND PROGRAM FOR GAMING MACHINE UTILIZING VIRTUAL THREE-DIMENSIONAL SPACE

(71) Applicant: Konami Gaming, Inc., Las Vegas, NV (US)

(72) Inventor: Kazutaka Shiraishi, Zama (JP)

(73) Assignee: Konami Gaming, Inc., Las Vegas, NV (US)

(*) Notice: Subject to any disclaimer, the term of this patent is extended or adjusted under 35 U.S.C. 154(b) by 0 days.

This patent is subject to a terminal disclaimer.

(21) Appl. No.: 16/800,534

(22) Filed: Feb. 25, 2020

(65) Prior Publication Data

US 2021/0134126 A1 May 6, 2021

Related U.S. Application Data

(63) Continuation of application No. 15/971,232, filed on May 4, 2018, now Pat. No. 10,614,675, which is a (Continued)

(30) Foreign Application Priority Data

Sep. 18, 2014 (JP) ................................ 2014-190336

(51) Int. Cl.

*A63F 13/00* (2014.01)
*G07F 17/34* (2006.01)
*G07F 17/32* (2006.01)

(52) U.S. Cl.

CPC .......... *G07F 17/34* (2013.01); *G07F 17/3211* (2013.01); *G07F 17/3213* (2013.01); *G07F 17/3269* (2013.01); *G07F 17/3267* (2013.01)

(58) Field of Classification Search

CPC ............ G07F 17/3211; G07F 17/3213; G07F 17/3267; G07F 17/3269; G07F 17/34; G07F 17/326; G07F 17/3209

See application file for complete search history.

(56) References Cited

U.S. PATENT DOCUMENTS 5,934,672 A 8/1999 Sines et al.
6,908,381 B2 6/2005 Ellis (Continued)

FOREIGN PATENT DOCUMENTS

JP 2014-110925 A 6/2014

*Primary Examiner* — Justin L Myhr
(74) *Attorney, Agent, or Firm* — Howard & Howard Attorneys PLLC

(57) ABSTRACT

A gaming machine that provides an operation unit, a display unit that displays a plurality of symbols in a determination area, changes and stops a plurality of symbols displayed on the display unit according to an operation of a player received from an operation unit, and a control unit that pays a payout according to the symbol stopped inside of the determination area, a control unit displays an object that shows a symbol inside of a virtual three-dimensional space that extends a column of the determination area in a depth direction on the display unit, aligns a plurality of objects in a depth direction in a non-determination area and the determination area, and changes a plurality of symbols by moving the plurality of objects along in a depth direction.

20 Claims, 23 Drawing Sheets

Related U.S. Application Data continuation of application No. 14/845,038, filed on Sep. 3, 2015, now Pat. No. 10,008,077.

(56) References Cited

U.S. PATENT DOCUMENTS

| | | | |
|---|---|---|---|
| 2004/0102244 | A1 | 5/2004 | Kryuchkov et al. |
| 2007/0004513 | A1 * | 1/2007 | Wells .................. G07F 17/3216 463/31 |
| 2008/0108413 | A1 | 5/2008 | Gelber et al. |
| 2008/0234032 | A1 | 9/2008 | Brunet de Courssou et al. |
| 2011/0045891 | A1 | 2/2011 | Ansari |
| 2011/0045906 | A1 | 2/2011 | Berman et al. |
| 2013/0157742 | A1 | 6/2013 | Pacey et al. |

* cited by examiner

GAMING MACHINE, CONTROL METHOD FOR MACHINE, AND PROGRAM FOR GAMING MACHINE UTILIZING VIRTUAL THREE-DIMENSIONAL SPACE

CROSS-REFERENCE TO RELATED APPLICATION

This application is a continuation of U.S. patent application Ser. No. 15/971,232, filed May 4, 2018 now U.S. Pat. No. 10,614,675, issued Apr. 7, 2020), which is continuation of U.S. patent application Ser. No. 14/845,038, filed Sep. 3, 2015 (now U.S. Pat. No. 10,008,077, issued Jun. 26, 2018), which claims priority to Japanese Patent Application No. 2014-190336, filed Sep. 18, 2014, the disclosures of which are hereby incorporated by reference in their entirety.

TECHNICAL FIELD

The present invention relates to a gaming machine, a control method for a gaming machine, and a program for a gaming machine.

BACKGROUND ART

A gaming machine represented by a slot machine is highly popular among casino customers as a device that provides gaming that is easy to enjoy, and recent statistics report that sales from gaming machines account for the majority of casino earnings. Initial slot machines were simple devices, wherein an inserted coin is received, a configured reel rotates and stops mechanically according to a handle operation, and a win or a loss is determined by a combination of symbols stopped on a single pay line. However, recent gaming machines, such as mechanical slot machines driven by a highly accurate physical reel via a computer controlled stepping motor, video slot machines that display a virtual reel on a display connected to a computer, and various gaming machines that apply similar technology to other casino games are quickly advancing. For the manufacturers that develop these gaming machines, an important theme is to provide an attractive game that strongly attracts casino customers as players, and improves the functionality of the gaming machine.

Under this type of background, recent gaming machines, attract the interest of game players, by executing a variety of staging processes in images displayed on a display unit. For example, in recent years, interest has risen in games, by displaying three-dimensional images that have perspective on a display unit, replacing planar images that do not have perspective (For example, see patent document 1).

DOCUMENTS OF THE RELATED ART

Japanese Unexamined Patent Application Publication No. 2014-110925.

SUMMARY OF INVENTION

The gaming machine according to patent document 1, in a staging process, merely replaces a planar image that does not have perspective with a three-dimensional image that has perspective for an image displayed on the display unit, but this may not have visual effects that sufficiently attract the interest of a player.

In light of the above circumstances, various aspects of the present invention aim to provide a gaming machine that can produce a powerful visual effect heretofore conventionally unavailable, a control method for a gaming machine, and a program for a gaming machine.

To solve such problems, a gaming machine according to one aspect of the present invention is a gaming machine that includes an operation unit (or part) that receives an operation of a player; a display unit (or part) that displays a plurality of symbols in a determination area having a plurality of rows and columns; and a control unit (or part) connected to the operation unit and the display unit that changes and stops the plurality of symbols displayed on the display unit according to the operation of the player received by the operating part and that pays a payout according to the stopped symbols inside the determination area; wherein the gaming machine changes the plurality of symbols by the control unit, displaying an object that shows the symbol inside a virtual three-dimensional space that extends a column of a determination area in a depth direction on a display unit, aligning the plurality of objects in a depth direction in the determination area and in a non-determination area positioned on the depth side of the determination area, and moving the plurality of objects along a depth direction.

Further, a control method for a gaming machine according to another aspect of the present invention is a control method for a gaming machine executed by a control unit that, connects an operation unit that receives an operation from a player and a display unit that displays a plurality of symbols in a determination area having a plurality of rows and columns, changes and stops a plurality of symbols displayed on the display unit according to the operation of the player received by the operating part, and pays a payout according to the stopped symbols inside the determination area; the method including steps for changing the plurality of symbols by the control unit, displaying an object that shows the symbol inside a virtual three-dimensional space that extends a column of the determination area in a depth direction on the display unit according to the operation of the player received from the operation unit, aligning the plurality of objects in a depth direction in the determination area and in a non-determination area positioned on the depth side of the determination area, and moving the plurality of objects along in a depth direction.

Further, a program for a gaming machine related to another aspect of the present invention is a program for a gaming machine that operates one computer or a plurality of computers as a control unit that connects an operation unit that receives an operation from a player and a display unit that displays a plurality of symbols in a determination area having a plurality of rows and columns, changes and stops the plurality of symbols displayed on the display unit according to the operation of the player received from the operating part, and pays a payout according to the stopped symbols inside the determination area; the program of a gaming machine including operating the one or a plurality of computers as a control unit to change the plurality of symbols by, displaying an object that shows the symbol inside of a virtual three-dimensional space that extends a column of a determination area in a depth direction on a display unit according to the operation of a player received from the operation unit, aligning the plurality of objects in a depth direction in the determination area and in a non-determination area positioned on the depth side of the determination area, and moving the plurality of objects along in a depth direction.

Effect of the Invention

According to various aspects of the present invention, a gaming machine that can produce an unconventional powerful visual effect, a control method for a gaming machine, and a program for a gaming machine can be provided.

DETAILED DESCRIPTION OF EMBODIMENTS

A gaming machine according to an embodiment of the present invention referencing the attached figures is described in detail below. Further, duplicated descriptions will be omitted for identical attached symbols in identical or corresponding parts in each figure.

Figure 1:
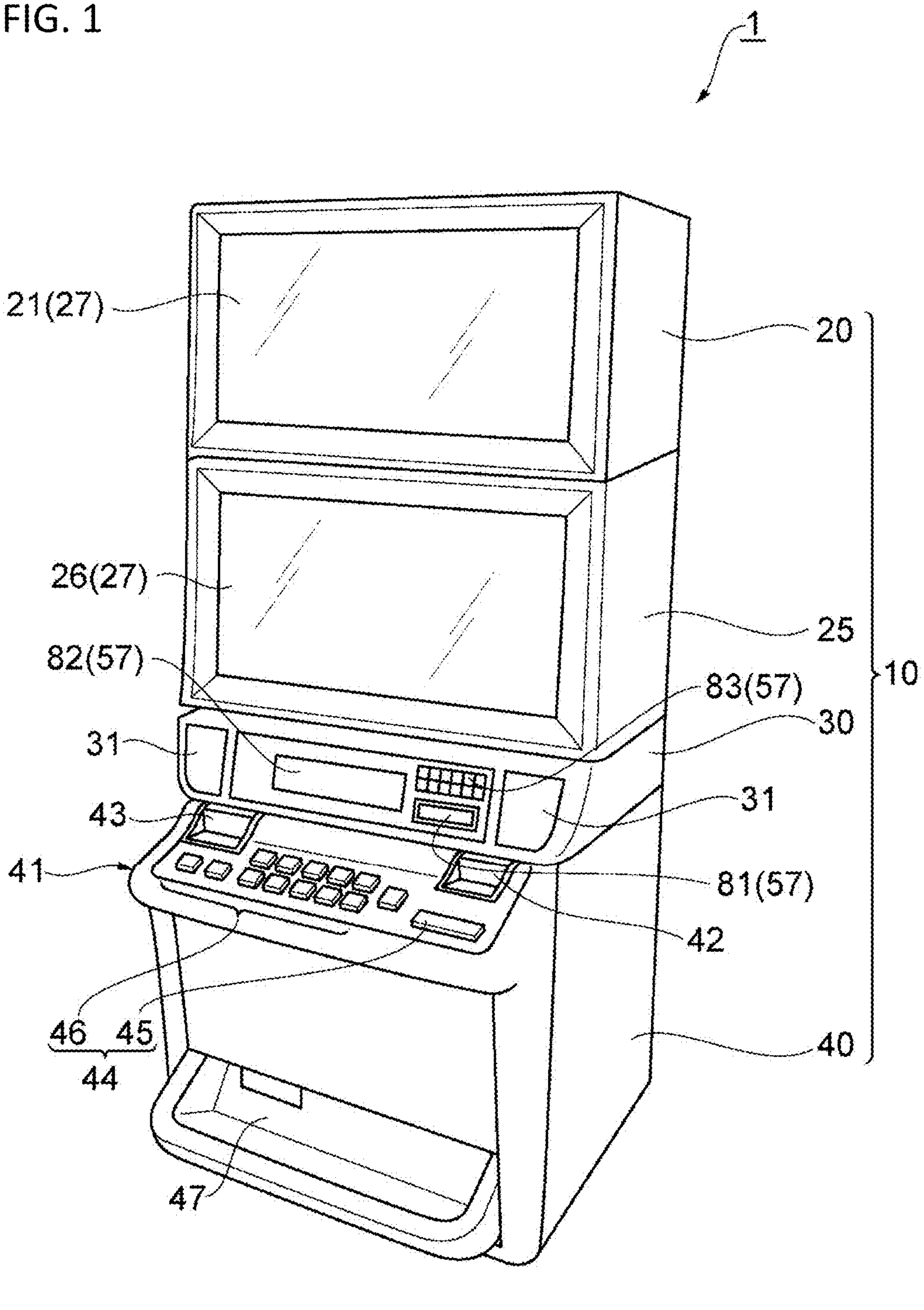
FIG. 1 is a perspective view of the gaming machine according to the first embodiment.

The gaming machine according to the present embodiment receives a predetermined game value from the player, generates a game result, and provides a payout to the player according to the game result. FIG. 1 is a perspective view of a gaming machine 1 according to the present embodiment. As shown in FIG. 1, this gaming machine 1 provides a first cabinet 20 providing an upper display 21, a second cabinet 25 providing a lower display 26, a third cabinet 30 that houses a player tracking unit 57 and a control panel 41, and has a housing 10 configured from a fourth cabinet 40 that houses a control unit 50 that controls each part. Each configuration is described below.

The first cabinet 20 is provided on the upper part of the housing 10, and the second cabinet 25 is provided below the first cabinet 20. The upper display 21 provided on the first cabinet 20 and the lower display 26 provided on the second cabinet 25, are flat panel display devices such as both liquid crystal display devices and organic EL display devices and the like, and by controlling via each control unit 50 the game screen mentioned below functions as a display unit 27 provided to the player.

The third cabinet 30 is provided below the second cabinet 25. Speakers 31 are provided on the left and right of the front surface of the third cabinet 30, and by controlling via the control unit 50, sound is provided to the player. Further, the player tracking unit 57 is housed on the center of the front surface of the third cabinet 30. The player tracking unit 57 has a card reader 81 that recognizes a player identification card, a display 82 that presents data to the player, and a keypad 83 that receives input by the player. This type of player tracking unit 57, reads information recorded on the player identification card inserted by the player into the card reader 81, and displays the information and/or information acquired by communicating with the external system on the display 82, by cooperatively operating with the control unit 50 mentioned below or an external system. Further, input from the player is received by the keypad 83, the display of the display 82 is changed according to the input, and communication with the external system is carried out as necessary.

The fourth cabinet 40 is provided below the third cabinet 30. On the fourth cabinet 40, one part is made to project from a front side, and the control panel 41 is provided. On the control panel 41, a bill/ticket identification unit 42, the printer unit 43, and an operation unit 44 are provided.

The bill/ticket identification unit 42 is disposed on the control panel 41 in a state where the insertion opening that a bill or ticket is inserted into is exposed, an identification unit or part that identifies a bill/ticket by various sensors on the inside of the insertion opening is provided, and a bill/ticket storage part is provided on the outgoing side of the identification part on the inside of the fourth cabinet 40. The bill/ticket identification unit 42, receives and identifies bills and tickets (including vouchers and coupons) that are the game value as a game executing value, and notifies the control unit 50 mentioned below.

The printer unit 43, is disposed on the control panel 41 in a state where the ticket output opening that a ticket is output from is exposed, a printing part or unit that prints predetermined information on a printing paper on the inside of the ticket output opening is provided, and a housing part or unit that houses the printing paper inside the paper inlet side of the printing unit is provided. The printer unit 43, under the control of the control unit 50 mentioned below, prints information on paper and outputs a ticket according to credit payout processing from the gaming machine 1. The output ticket can use the payout credit as game play by being inserted into the bill/ticket identification unit of another gaming machine, or, can be exchanged for cash by a kiosk terminal inside of the casino or a casino cage.

The operation unit 44 receives the operation of the player. The operation unit 44 is a group of buttons that receives various instructions from the player on the gaming machine 1. The operation unit 44, for example, has a spin button 45 and group of setting buttons 46. The spin button 45 receives an instruction to start (start rotating the reel) the game listed below. The group of setting buttons 46 includes a group of bet buttons, a group of line-designation buttons, a max bet button, and a payout button and the like. The group of bet buttons receive an instruction operation regarding the bet amount of credits (bet number) from the player. The group of line-designation buttons receive an instruction operation that designate a pay line (referred to as an effective line below) subjected to a line judgment below from the player. The max bet button receives an instruction operation regarding the bet of the maximum amount of credits that can be at one time from the player. The payout button receives an instruction operation instructing a credit payout accumulated in the gaming machine 1.

Further, on the inside of the fourth cabinet 40, a control board equipped with a central processing unit 51 (abbreviated as CPU below) that configures the control unit 50, an interface unit (or part) 52, a memory 53 and a storage 54 and the like is incorporated. The control board configured so that communication is possible through the interface unit 52 and each of the components equipped on the first cabinet 20, the second cabinet 25, the third cabinet 30, and the fourth cabinet 40, controls the operation of each part by executing the program recorded in the memory 53 or the storage 54 of the CPU 51, and provides a game to the player.

Figure 2:
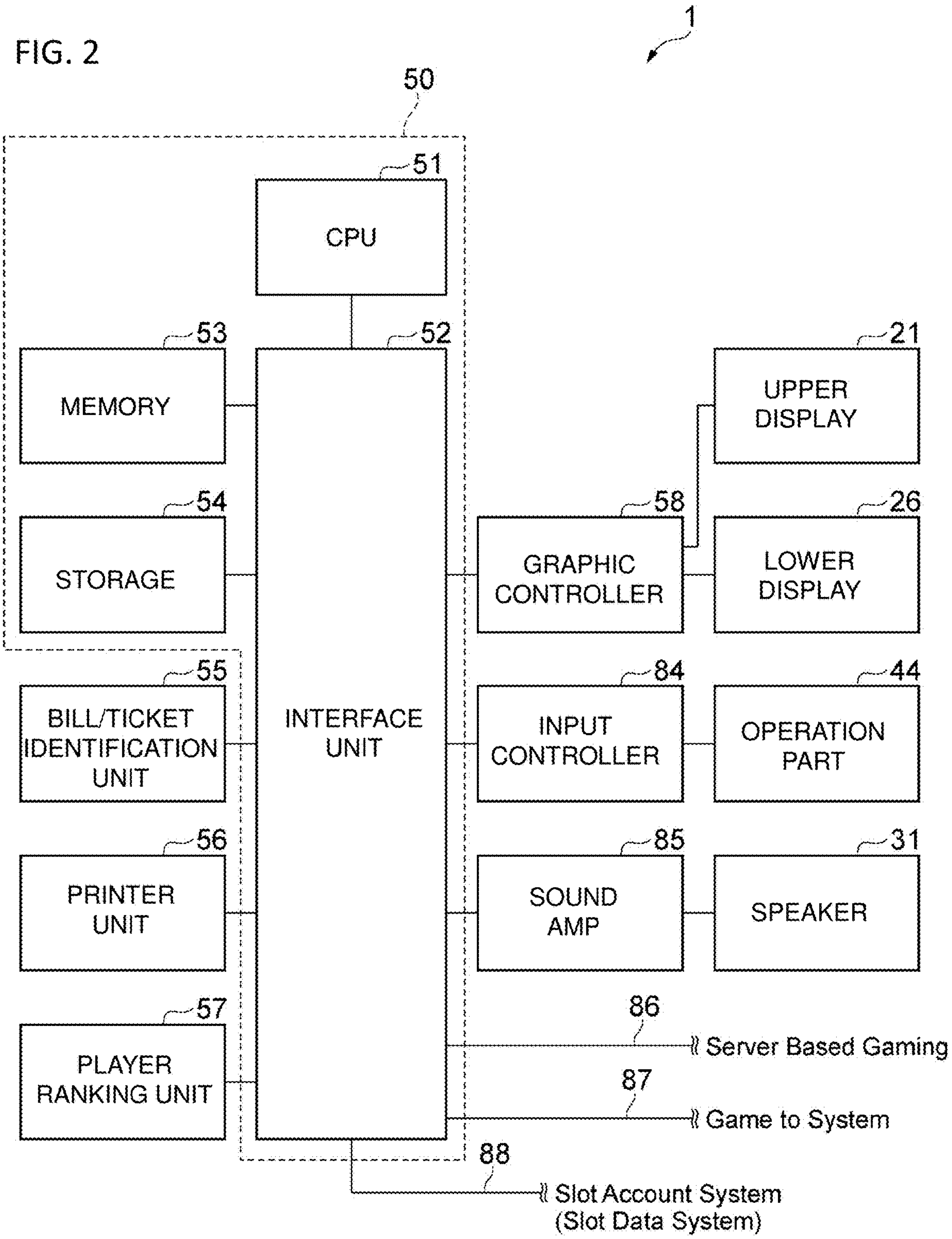
FIG. 2 is a functional block diagram of the gaming machine in FIG. 1.

FIG. 2 shows a functional block diagram of the gaming machine 1 according to the present embodiment. The gaming machine 1 provides the control unit 50. The control unit 50 is configured as the interface unit 52 including a chip set providing communication functions of the CPU 51, a memory bus connected to a CPU, various expanding buses, serial interfaces, USB interfaces, Ethernet (registered trademark) interfaces and the like, and a computer unit where the CPU 51 provides the addressable memory 53 and the storage 54 through the interface unit 52. The memory 53 can be configured to include RAM that is a volatile storage medium, ROM that is a nonvolatile storage medium, and EEPROM that is a rewritable nonvolatile storage medium. The storage 54 provides the control unit 50 as an external storage device function, can use reading devices such as a memory card that is a removable storage medium, and a magneto optical disk and the like, and can use hard disks.

On the interface unit 52, in addition to the CPU 51, the memory 53, and the storage 54, a bill/ticket identification unit 55, a printer unit 56, the player tracking unit 57, a graphic controller 58, an input controller 84, and a sound amp 85 are connected. That is, the control unit 50 is connected to the operation unit 44 through the input controller 84, and connected to the upper display 21 and/or the lower display 26 through the graphic controller 58. Further, when illumination that provides decorative lighting to the gaming machine 1 is provided, the illumination is controlled under the control of the control unit 50 on the interface unit 52, and an illumination controller that provides a decorative lighting effect may be connected.

The control unit 50 that has such memory 53 and storage 54, controls each part by executing a program stored in the memory 53 and the storage 54, and provides a game to the player. Here, for example there may be a configuration that stores a program and data of an operating system and subsystem that provides the basic functions of the control unit 50 to the EEPROM of the memory 53, and stores a program and data of an application that provides a game to the storage 54. According to such a configuration, it can be easy to change or update a game by replacing the storage 54. Further, the control unit 50 may be a multiprocessor configuration that has a plurality of CPUs.

Each block connected to the control unit 50 is described below.

The bill/ticket identification unit 55 corresponds to the bill/ticket identification unit 42, receives bills or tickets in the insertion opening, and notifies the control unit 50 identifying information corresponding to the payout processing of an assortment of bills or credits. The bill/ticket identification unit 55 notifies the information to the control unit 50, and the control unit 50 increases the usable credit amount inside of the game according to the notified content. The printer unit 56 corresponds to the printer unit 43, and under the control of the control unit 50 that receives an operation of the payout button of the group of setting buttons 46, information corresponding to the credit payout processing from the gaming machine 1 is printed and output on a printed ticket.

The player tracking unit 57 cooperatively operates with the control unit 50, and sends and receives information and the like of the player between the casino management system. The graphic controller 58 controls the upper display 21 and the lower display 26, under the control of the control unit 50, and displays a display image that includes various graphic data. The sound amp 85 drives the speakers 31 under the control of the control unit 50, and provides various sounds such as an announcement, sound effects, BGM and the like.

Further, the interface unit 52, has various communication interfaces for communicating with the exterior of the gaming machine 1, for example can communicate with an external network by Ethernet 86, 87, and a serial output 88. In the present embodiment, one example shows when there is communication between a well known server side gaming network (Server Based Gaming of FIG. 2), a G2S network (Game to System of FIG. 2), and a slot information system (Slot Data System of FIG. 2), respectively.

Figure 3:
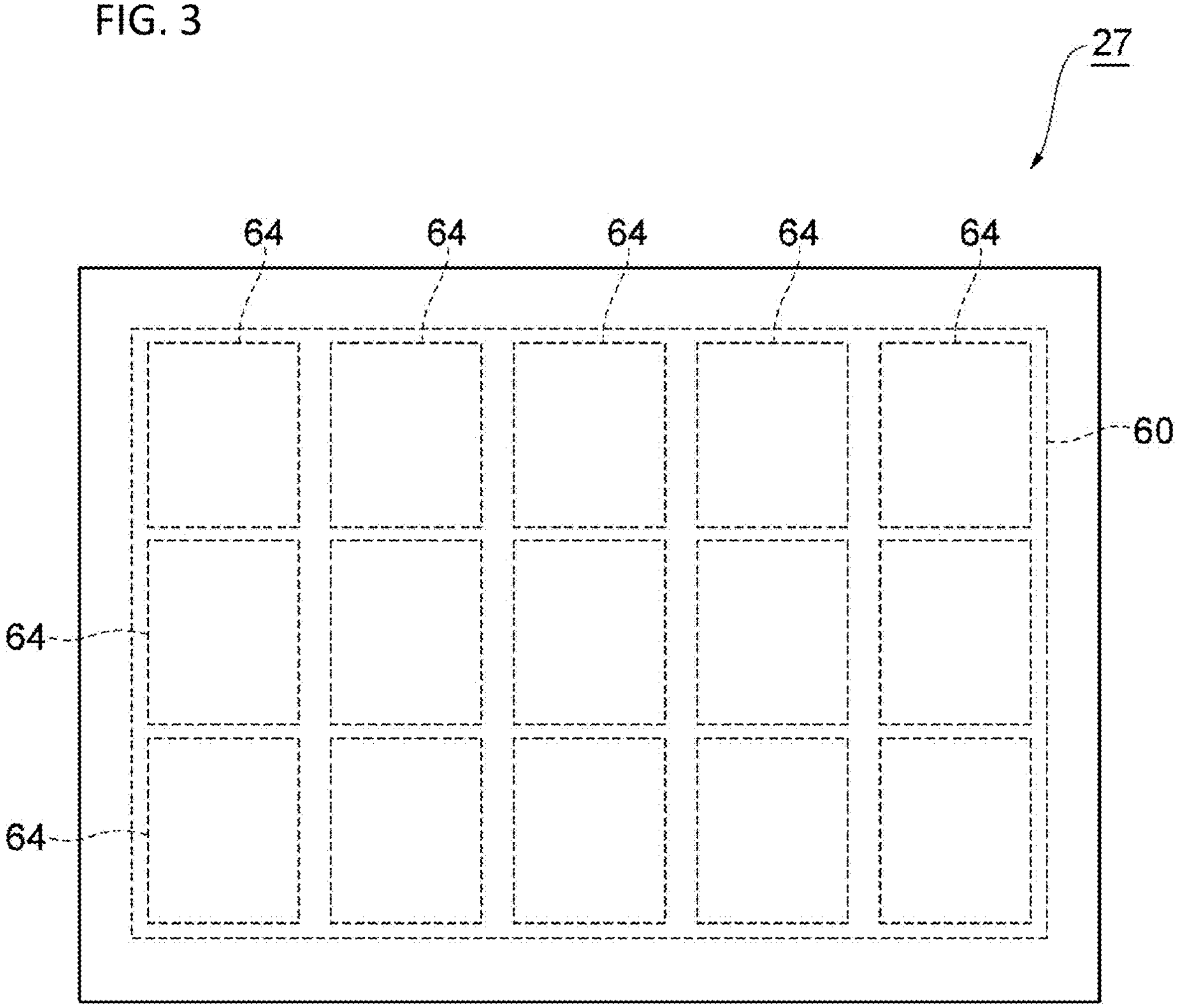
FIG. 3 is a schematic figure showing one example of a determination area of the gaming machine in FIG. 1.

FIG. 3 is a figure schematically showing a game screen provided by the gaming machine 1 according to the present embodiment. Such a game screen displays on the display unit 27 (the upper display 21 and/or the lower display 26) by the control unit 50 executing a predetermined program. The present embodiment shows the state of displaying the game screen on the lower display 26. As shown in FIG. 3, this game screen has a determination area 60 for displaying symbols. By using such a game screen, the gaming machine 1 of the present embodiment, operates as a slot machine that pays a payout according to a winning combination of symbols displayed on the determination area.

The display unit 27 displays a plurality of symbols in the determination area 60 that has a plurality of rows and columns. The determination area 60 is configured by a plurality of cells 64 that are the stop position of symbols. Specifically, the determination area 60 is configured by 15 cells disposed in a grid shape of 3 rows and 5 columns. Further, omitted in FIG. 3, the display unit 27 can display a decorative area, and an area that displays credit amount, bet number, and a credit amount obtained by winning (WIN number) and the like, outside of the determination area 60. On each of the plurality of cells 64 of the determination area 60, one symbol is stopped and displayed.

Figure 4:
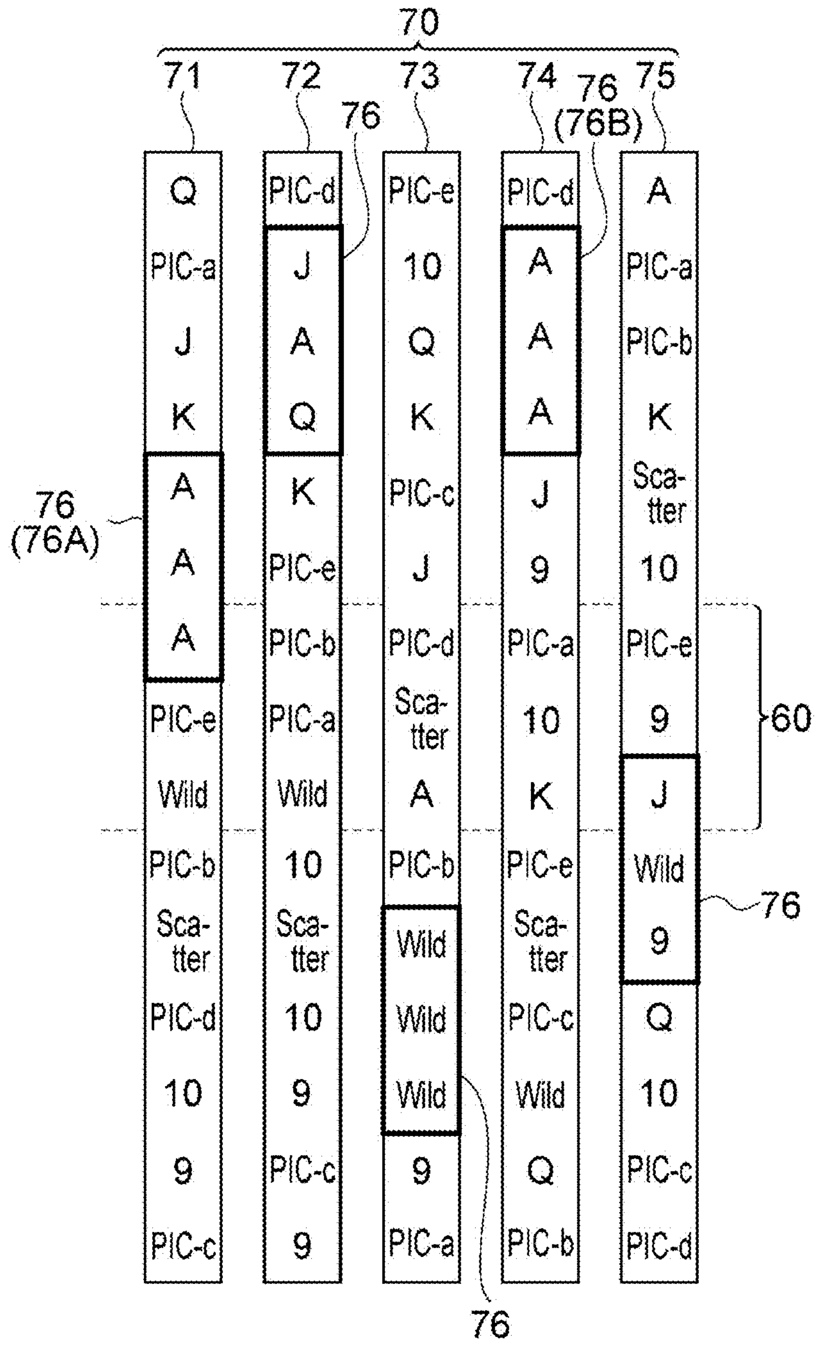
FIG. 4 is a figure showing one example of a symbol arrangement showing the order of symbols displayed on the determination area in FIG. 3.

On each cell 64 of the determination area 60, as shown in FIG. 4, a predetermined symbol is displayed based on the symbol arrangement of virtual reel strips 71 to 75 configured of a virtual reel set 70. That is, the cells 64 of the determination area 60 correspond to the virtual reel strips 71 to 75 by column, and the symbols disposed on predetermined parts of each virtual reel strip 71 to 75 are displayed. Furthermore, as mentioned below, by moving (scrolling) each symbol by column based on the symbol arrangement of the virtual reel strips 71 to 75, the symbols displayed on the cells 64 of the determination area 60 change, and by stopping the movement (scrolling) by columns, the symbols are stopped. Here, the virtual reel strips 71 to 75 are data where the control unit 50 uses a program having the memory 53 or the storage 54, and data showing the symbol arrangement (i.e., the order of symbols on each reel) regulated by each cell column. Further, the virtual reel set 70 is a general term for such virtual reel strips 71 to 75.

Figure 5:
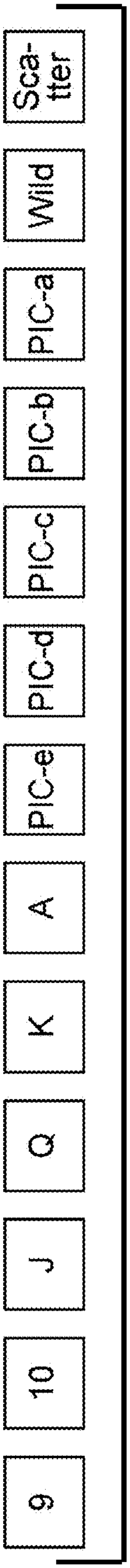
FIG. 5 is a figure showing the symbols displayed on the determination area in FIG. 3.

Each virtual reel strip 71 to 75, in an example of FIG. 4, is configured by 15 symbols and those symbols are aligned in an order defined by each reel. FIG. 5 is the details of symbols of the figure shown in FIG. 4. Each virtual reel strip 71 to 75 includes symbols selected from a symbol set of 13 varieties shown in FIG. 5. This symbol set includes card symbols ("9", "10", "J", "Q", "K", and "A") that imitate playing cards as regular symbols, and picture symbols ("PIC-a", "PIC-b", "PIC-c", "PIC-d", and "PIC-e") that show a pattern. Further, this symbol set includes a wild symbol ("Wild") that is substituted as another symbol when a win is determined and a scatter symbol ("Scatter") that is used when a win is determined for a special game as special symbols. Each of these symbols have a different rank from each other regarding their value when winning, their rank gradually raises in this order: "9", "10", "J", "Q", "K", "A", "PIC-e", "PIC-d", "PIC-c", "PIC-b", "PIC-a". A combination of symbols that includes high-ranking symbols when winning, can obtain a larger winning payout compared to a combination of low-ranking symbols when winning.

Furthermore, in the present embodiment, each of the virtual reel strips 71 to 75 has a frame 76 that surrounds a group of continuous symbols. The group of continuous symbols is continuous symbols that are included in the symbol arrangement of the virtual reel strips 71-75. The group of continuous symbols, for example are a stack of symbols such as a group of continuous symbols composed of three continuous symbols "Wild", and a group of continuous symbols composed of three continuous symbols "PIC-a" and the like. The group of continuous symbols may be a group of symbols composed of different varieties of symbols, and are not limited to being a symbol stack composed of the same varieties of symbols. Further, the group of continuous symbols may be a group of continuous symbols composed of two continuous symbols, and may be a group of continuous symbols composed of four or more continuous symbols. The frame 76, as mentioned below, is displayed in the determination area 60 so that the frame may be moved along with the group of continuous symbols. By the stop positions of the virtual reel strips 71 to 75, the frame 76 that surrounds the group of continuous symbols is displayed in the determination area 60. The symbols displayed in the frame 76, may be determined separately and randomly, the same symbols may be in a state displaying each frame 76, and the same symbols may be in a state displaying the entire frame 76.

The control unit 50 that starts a game, determines the stop position of each virtual reel strip 71 to 75 randomly, the virtual reel strips 71 to 75 move from a current position, and the operation to stop on a stop position uses the display unit 27 (for example the lower display 26) and is expressed. Due to this, in the determination area 60, the symbols or the frame 76 included on the virtual reel strips 71 to 75 are continuously moved (scrolled) in the vertical direction of the determination area 60, and one symbol of one cell 64 aligned in an order of the frame or of the symbol based on the symbol arrangement is stopped so that it is displayed.

The control unit 50 changes and stops the plurality of symbols displayed on the display unit 27 according to the operation of the player received by the operation unit 44, and a payout is paid according to the stopped symbols inside the determination area 60.

Figure 6:
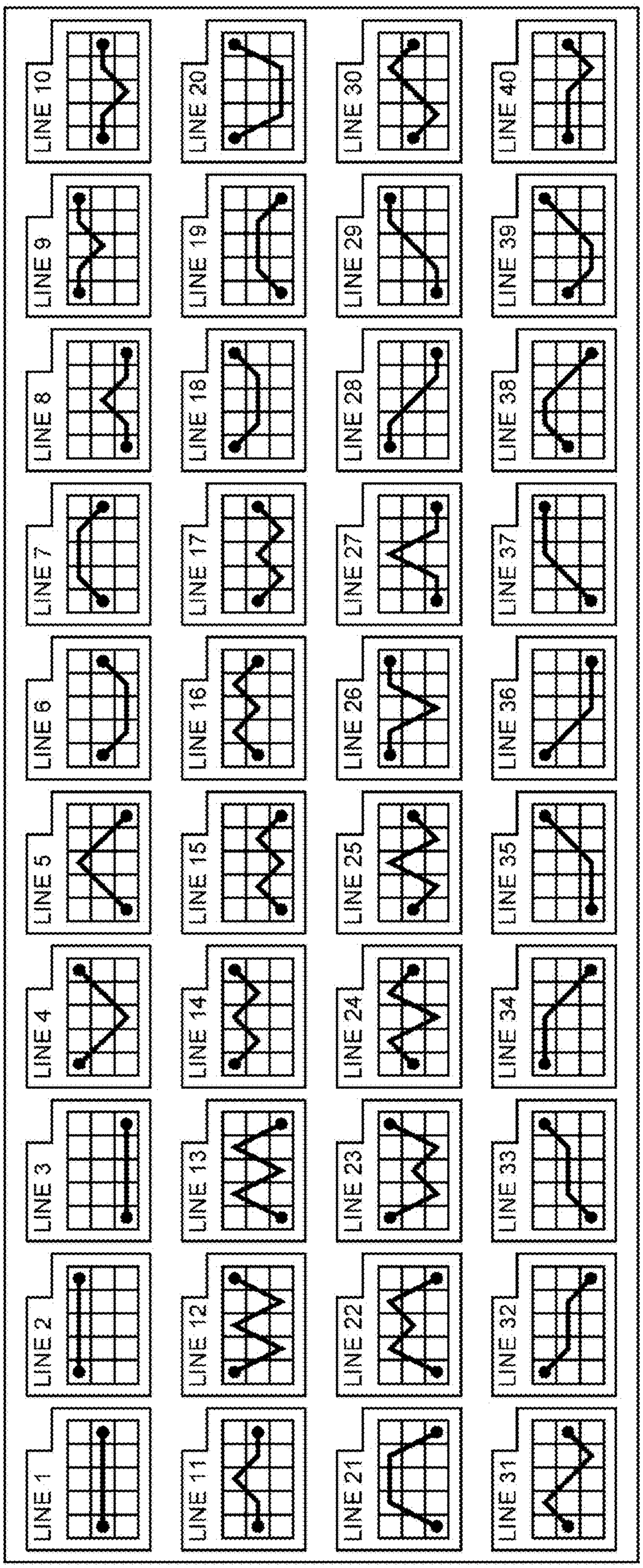
FIG. 6 is a figure showing one example of a pay line set on the determination area in FIG. 3.

In the determination area 60, a pay line is set that is used when winning is determined. The pay line is set to be extended over the column on the right end from the cells of the column of the left end, and is a line that combines the plurality of cells 64 determining a win. The number of effective lines within the set pay line are selected by the operation of a group of line designation buttons included in the group of setting buttons 46 of the operation unit 44 for the player. The control unit 50, in regards to the result of a game that is a combination of symbols, determines a win when a predetermined number of identical symbols is surpassed and aligned on a set pay line, and pays a payout to the player according to the type and number of symbols. On the gaming machine 1 of the present embodiment, a predetermined number of pay lines (LINE 1-40) of cells with three rows and five columns in the determination area 60 is set (reference FIG. 6). The system for determining a win may determine a win when a predetermined number of identical symbols from cells of the column on the left end are aligned on a set pay line, may determine a win when a predetermined number of identical symbols from cells of the column on the right end are aligned on a set pay line, and may determine a win when a predetermined number of identical symbols are aligned on a continuous column on a predetermined pay line.

The gaming machine 1 of the present embodiment, provides two types of games, a regular game (referred to as a main game, or prime game) provided when predetermined conditions are not satisfied, and a special game (referred to as a bonus game, or feature game, and includes providing a free game that does not consume game value) provided when predetermined conditions are satisfied. Concerning a regular game and a special game, the symbols displayed in the determination area 60 configure a combination of symbols that are the result of a game, and determine a win. In the gaming machine 1 according to the present embodiment a feature stage can be carried out. A feature stage can be used in both a regular game and a special game. A situation where a feature stage is used in a special game is described below.

For example, in the situation of a regular game, the control unit 50 two-dimensionally displays an object that shows a symbol on the display unit 27, and by moving the object inside of a two-dimensional plane in a vertical direction a plurality of symbols can be changed in the determination area 60. Here, the object that shows a symbol may be two-dimensional CG (Computer Graphics), and may be three-dimensional CG calculated from a three-dimensional model. The form that two-dimensionally displays an object showing a symbol on the display unit 27, displays an object on a screen of the display unit 27 and a parallel surface, and is equivalent to a form displayed by a general slot machine. In the specification, this type of screen form may be referred to as a two-dimensional game screen.

Further, as a substitute to CG, picture data or data that processes picture data may be used.

Furthermore, the control unit 50, when predetermined conditions are satisfied, that is, in the case of a special game (a game that carries out a feature stage here), in a virtual three-dimensional space where a column of the determination area 60 extends in a depth direction an object that shows a symbol is displayed on the display unit 27, a plurality of objects are aligned in a depth direction in the determination area 60 and on the depth side, and by the plurality of objects moving along in a depth direction of the screen of the display unit 27, a plurality of symbols can be changed. That is, the object here, is displayed to change and stop in a virtual three-dimensional space spreading in a depth direction of a screen of the display unit 27. More specifically, the control unit 50 is inclined in a depth direction of a screen of the display unit 27, and the column along the depth direction displays an extending determination area 60, and a game is provided on this determination area 60. As an object that shows a symbol, three-dimensional CG may be used and two-dimensional CG may be used. When three-dimensional CG is used, the three-dimensional model is disposed inside of the virtual three-dimensional space, and a screen can be configured as an image when seen inside a space from a virtual viewpoint set diagonally upward. Further, when two-dimensional CG is used, two-dimensional CG is disposed as if domino tiles are aligned inside of a virtual three-dimensional space, and similarly a screen can be configured. In the specification, this type of screen form may be referred to as a three-dimensional game screen.

Figure 7:
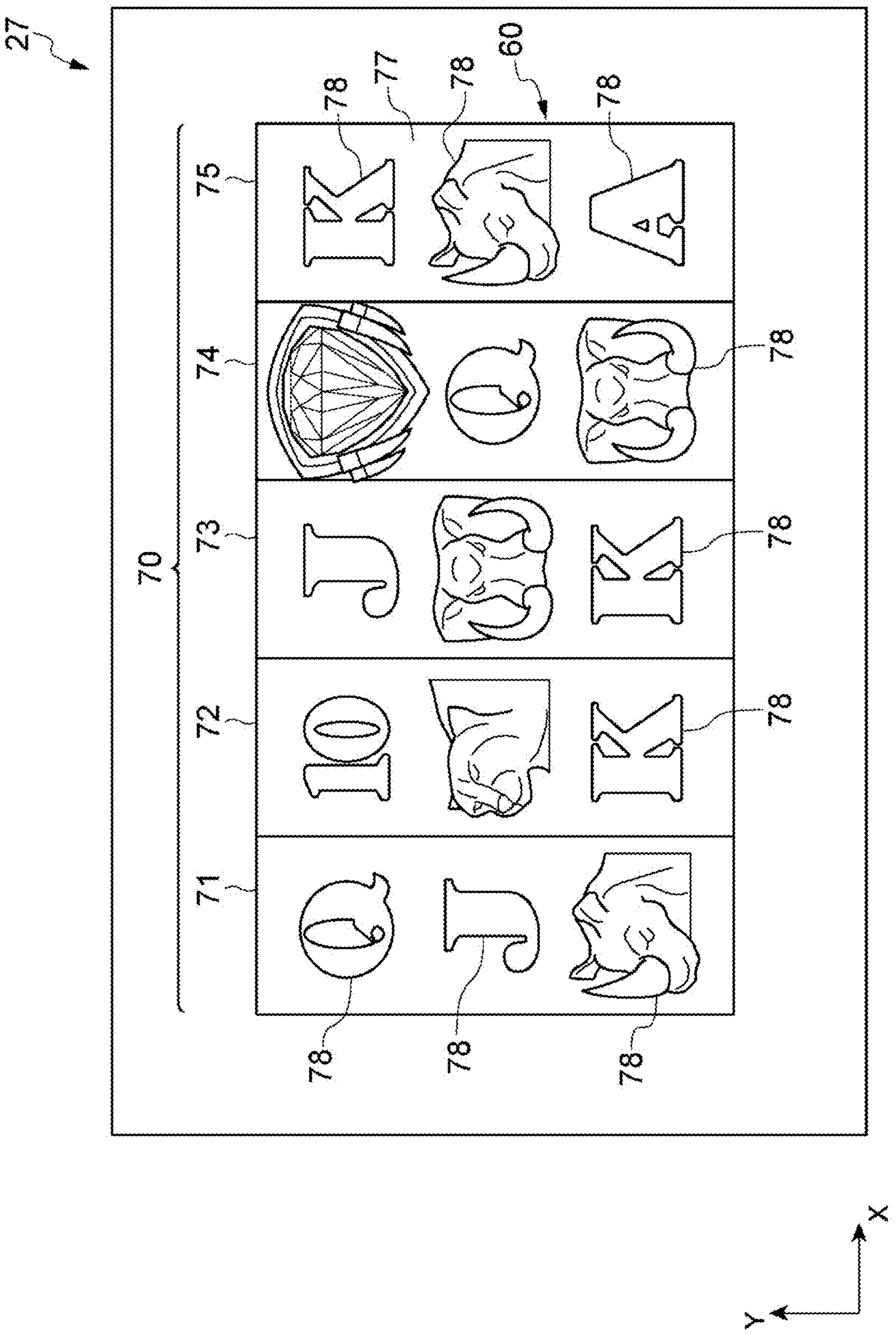
FIG. 7 is a figure showing the state of a game before starting on game screen of a regular game.

Next, the display form of the game screen on the display unit 27 that uses a two-dimensional game screen and a three-dimensional game screen references FIG. 7 to FIG. 19 and is described in detail. FIG. 7 to FIG. 12 are figures that show a screen transition of a regular game that uses a two-dimensional game screen. First, as shown in FIG. 7, before starting a regular game, the control unit 50 displays a two-dimensional game screen on the display unit 27. Further, in FIG. 7, each of boundary lines of the virtual reel strip 71 to 75 and the boundary lines of the determination area 60 are illustrated, these boundary lines may be displayed on a game screen in a state where the player can understand through a visual, and the display may also be omitted.

Figure 8:
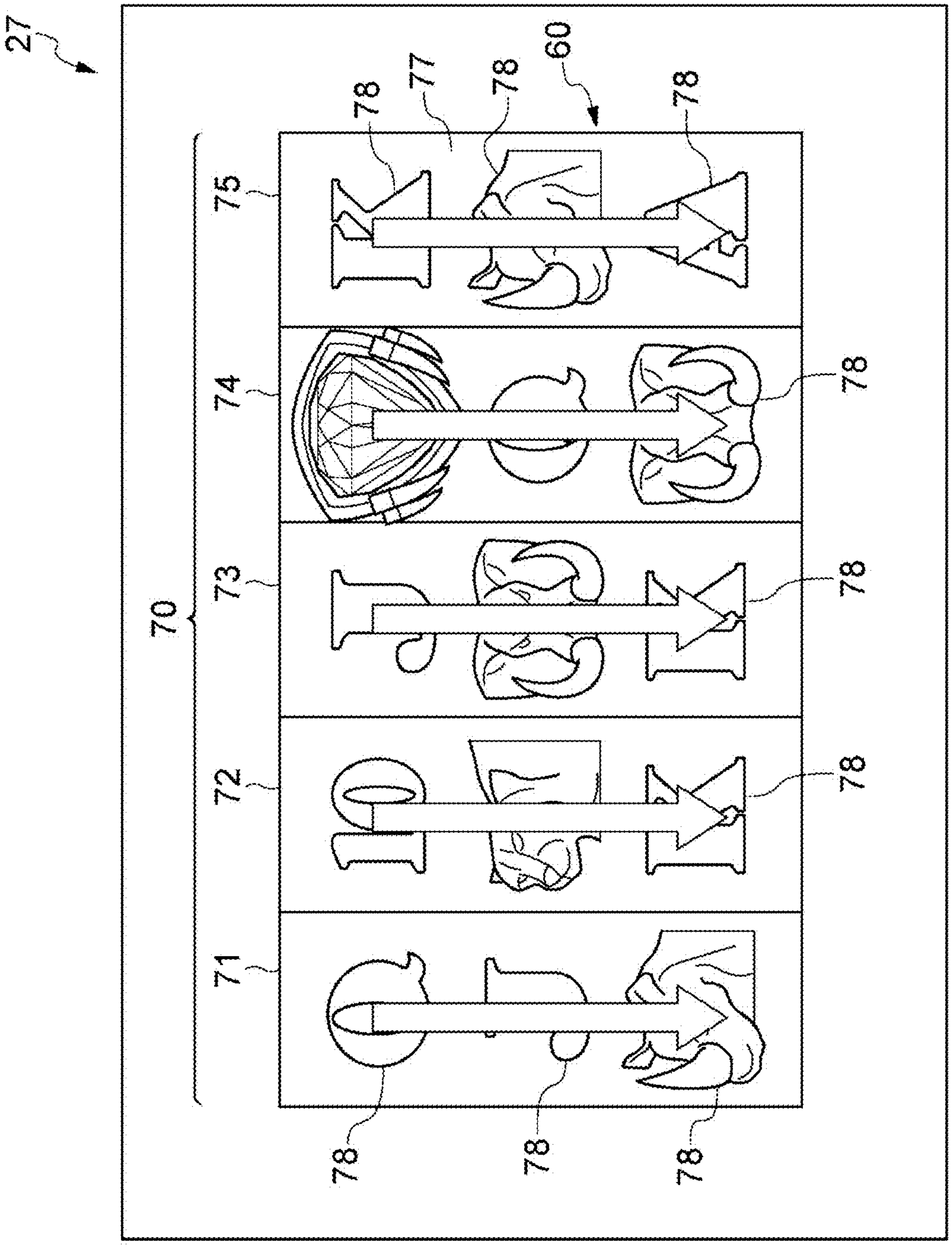
FIG. 8 is a figure showing the state of starting a reel spin on a two-dimensional game screen.
Figure 9:
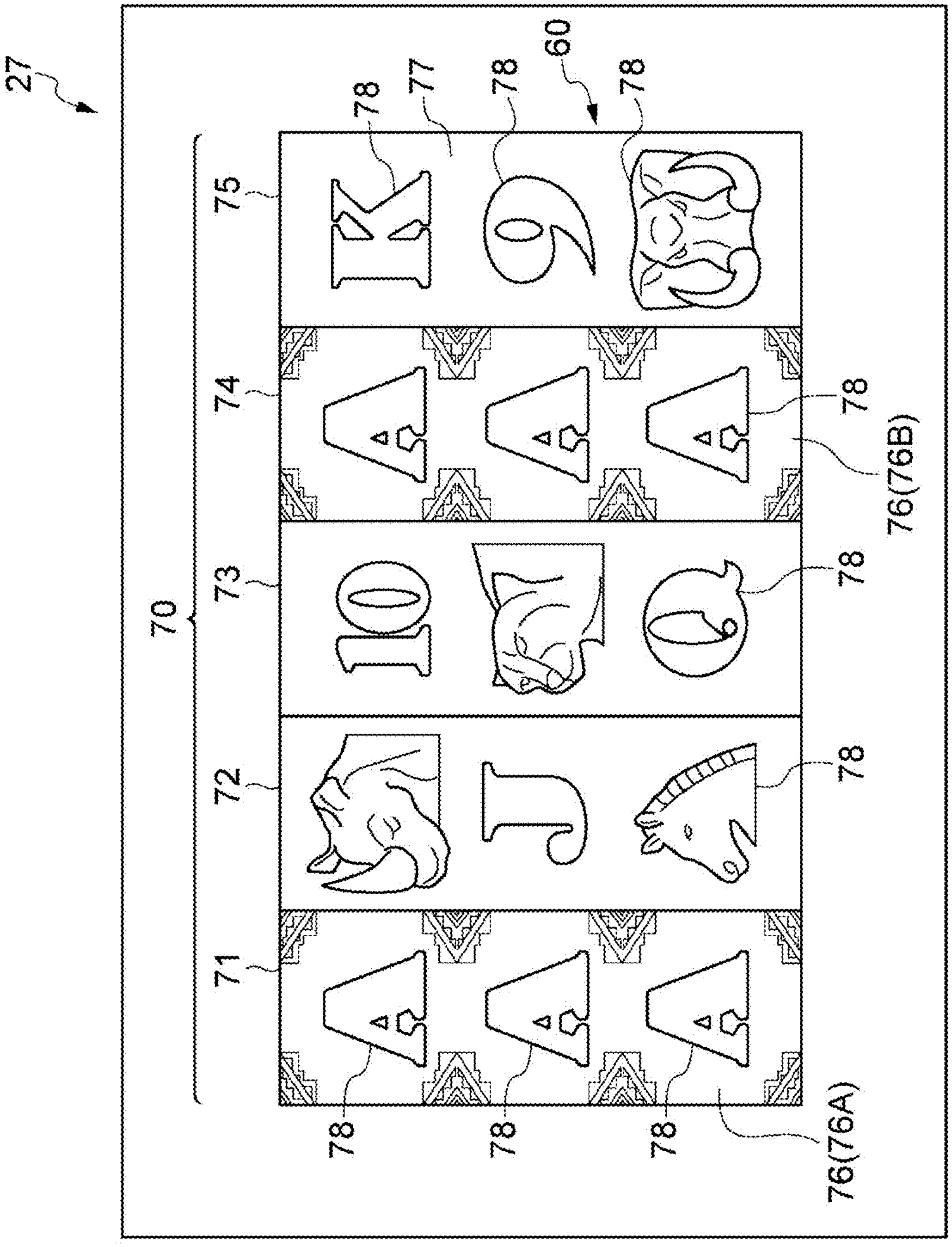
FIG. 9 is a figure showing the state of stopping a reel spin on a two-dimensional game screen.

When a game is started, as shown in FIG. 8, the control unit 50 starts a reel spin. More specifically, the control unit 50, in the determination area 60 displayed in a parallel state against a screen of the display unit 27, by moving an object 78, that shows a symbol according to an arrangement regulated by the virtual reel strips 71 to 75, parallel inside an identical surface, the virtual reel strips 71 to 75 change the symbols so the symbols are rotating. Next, as shown in FIG. 9, the control unit 50 determines the stop position of each virtual reel strip 71 to 75 randomly, the virtual reel strip 71 to 75 is stopped at the determined stop position, and the object 78 that shows a symbol is stopped. By this, in the determination area 60, symbols are displayed so that they move (scrolling) continuously in a vertical direction, and one symbol is stopped and displayed on one cell 64 while maintaining continuity.

The control unit 50 may determine the stop area where the frame 76 is displayed in the determination area 60 as the stop positions of the virtual reel strip 71 to 75. In the columns shown in FIG. 9, a frame 76A in a virtual reel strip 71 on the left end column, and a frame 76B in the virtual reel strip 74 on the fourth column from the left are displayed in the determination area 60. Further, when distinguishing and describing each of the plurality of frames 76, the first frame 76A and the second frame 76B are described below.

When the control unit 50 satisfies predetermined conditions, the three-dimensional game screen is displayed on the display unit 27. In the present embodiment, the control unit 50 provides a special game, by a feature stage that uses a three-dimensional game screen. The judgment of whether the predetermined conditions are satisfied may be carried out by the control unit 50, and may be carried out by other components. The judgment of whether the control unit 50 satisfies the predetermined conditions is described below. As for when predetermined conditions are satisfied, for example, a random number acquired from a random number generated by the control unit 50 or another component is a predetermined value or included in a predetermined range, the bet amount surpasses a predetermined value, the current time reaches a predetermined time, the current number of games reaches a predetermined number of games, a specific symbol is displayed, the frame 76 that is displayed in the determination area 60 satisfies predetermined frame display conditions, and a combination of these and the like can be given as examples.

The present embodiment describes in an example when predetermined conditions are predetermined frame display conditions. Predetermined frame display conditions are preset conditions, for example, conditions related to the number of frames 76 displayed in the determination area 60. Specifically, the predetermined frame display conditions are a predetermined number of the number of frames 76 that are displayed in the determination area 60, or are a predetermined number or more, or a predetermined number or less. Further, in the predetermined frame display conditions, the symbols of the frames 76 are identical or may be included as a corresponding condition. The frame display conditions are described below in an example where two or more frames 76 are stopped and displayed in the determination area 60. This situation, in the example shown in FIG. 9, the control unit 50 determines the frame display conditions that carry out a feature stage, as being satisfied, to stop and display the first frame 76A and the second frame 76B in the determination area 60. Further, the predetermined number used in the frame display conditions are not limited to two, but may be one, and may be three or more. By creating a trigger condition for a special game providing a feature stage by the frame display conditions, switching to a special game can be informed in a state that is easily understood by the player, so that the player can clearly distinguish between the game result (combination of symbols), and the trigger condition for a special game providing the feature stage.

Further, for example when a part of the frame 76 is displayed and stopped in the determination area 60, after temporarily stopping the frame 76, so that the entire frame 76 is displayed in the determination area 60, the control unit 50 carries out pull-in processing that moves the virtual reel strip 71 to 75, and after the pull-in processing there may be judgment of whether the frame display conditions are satisfied. By this type of pull-in processing, the feeling of expectation for switching to a special game can be maintained in the player until the scroll display of the entire frame 76 stops.

When the control unit 50 determines that the frame display conditions, based on the frame 76 displayed in the determination area 60, have been satisfied, before switching to a special game that displays a three-dimensional game screen on the display unit 27, so that the player has an advantageous situation in the special game, the symbol in the frame 76 is changed to a symbol with a higher rank, and the symbol inside of the frame 76 in the special game mentioned below may be made so that the symbol does not change. For example, the control unit 50 changes the object 78 that shows a symbol inside of both frame 76A and 76B, so that the group of continuous symbols inside of the second frame 76B become a group of continuous symbols configured of symbols that are at least one rank or more higher than the symbols inside of the first frame 76A. The symbols used and described in FIG. 5 (*a*) have a different rank from each other regarding their value when winning, the symbols are set so that the rank gradually rises in this order: "9", "10", "J", "Q", "K", "A", "PIC-e", "PIC-d", "PIC-c", "PIC-b", and "PIC-a". "Wild" and "Scatter" are set so that their ranks are higher than card symbols and picture symbols. A combination of symbols that includes high-ranking symbols when winning, can obtain a larger winning payout compared to a combination of low-ranking symbols when winning.

The control unit 50 changes the object 78 that shows a symbol inside of each frame 76A, and 76B, according to predetermined rules. As for predetermined rules, changing to a symbol that is one rank higher, changing to a symbol that is two ranks higher, and changing to "Wild" or "Scatter" can be given as examples. In this way, when the frame display conditions that switch to a special game are satisfied, so that the player can obtain a higher payout in the special game mentioned below, before switching to the special game, a change (rank up) of the symbols inside of the frame 76 occurs. By changing the stopped and displayed symbols to higher-ranking symbols in a regular game, the feeling of expectation can be improved for a high payout in a special game for the player.

Or, the control unit 50 may change all of the symbols inside of each frame 76A and 76B so that the symbols are identical. For example, the control unit 50 may change a symbol inside of the frame 76, so that the highest ranking symbol is displayed in the symbol display position of all the frame 76A and 76B, within a symbol determined after being changed in each frame 76A and 76B according to the predetermined rules. In this situation, the symbol inside the frame 76 is standardized before switching to a special game, and due to those symbols not changing in the special game, a feeling of expectation for a high payout can be aroused in the special game.

Furthermore, the control unit 50 moves only the frame 76B in a horizontal direction (to the aligned direction of the virtual reel strip 71 to 75), and standardization of such a symbol may be carried out, above adjacent frames 76A and 76B. In this situation, the symbols inside the adjacent frames 76A and 76B is standardized, and due to those symbols not changing in the special game, a feeling of expectation for a high payout can be further improved. Furthermore, when determining a win occurs in an order from the left end symbol on the effective line, the control unit 50 is disposed to fill the frame 76A and 76B from the left end, and such a symbol may be standardized.

Determining a win occurring in an order from the left end symbol on the effective line is described in detail below. First, the control unit 50 determines whether the frame 76 that can be left-aligned exists in the frame 76 displayed in the determination area 60. When the frame 76 that can be left-aligned exists, the frame 76 is displayed in a column other than the leftmost column of the determination area 60, and at least one column that does not display the frame 76 exists further on the left side than the column that includes the frame 76. For example as shown in FIG. 9, when the two displayed frames 76A and 76B are separated, so that a column (according to the virtual reel strip 72 and 73) that does not display the frame 76 exists on the left side of the second frame 76B that is displayed on the column of the virtual reel strip 74, the control unit 50 determines whether the second frame 76B is a frame that can be left-aligned.

Figure 10:
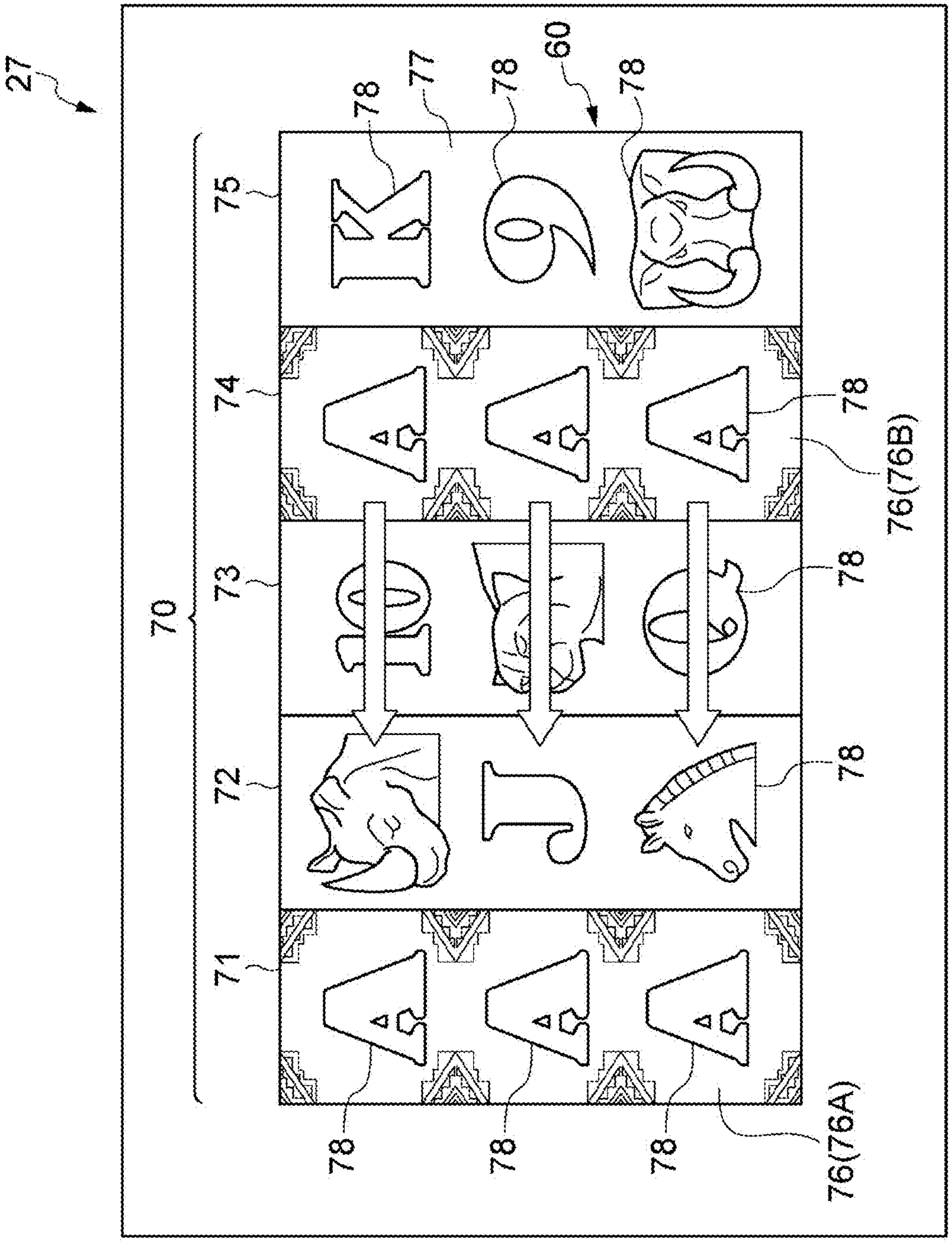
FIG. 10 is a figure showing the state of starting frame movement on a two-dimensional game screen.
Figure 11:
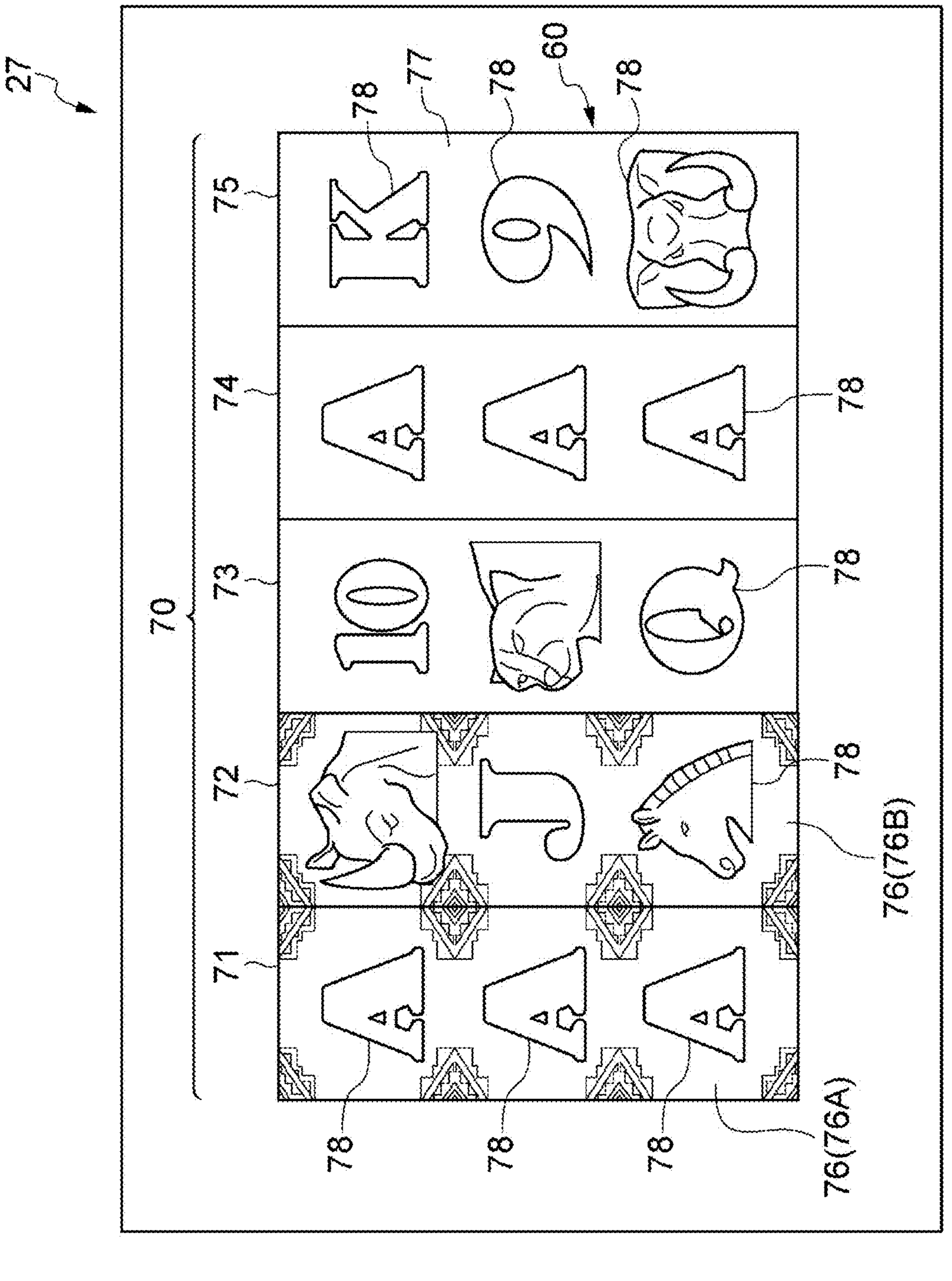
FIG. 11 is a figure showing the state of finishing frame movement on a two-dimensional game screen.

Furthermore, when a frame (the second frame 76B) that can be left-aligned exists, the control unit 50 moves the second frame 76B to the left side before switching to a special game. For example, as shown in FIG. 10, the control unit 50 displays the second frame 76B so that it is adjacent to the first frame 76A on the left side on the display unit 27 in the determination area 60. In this case, the control unit 50 does not change the object 78 that shows a symbol in the determination area 60, and only moves the second frame 76B to the second column from the left. By this, as shown in FIG. 11, the symbols in a stopped position of the virtual reel strip 71 to 75 are maintained in the determination area 60, and only the frame 76A and B is in a disposed state adjacent to the left end.

Figure 12:
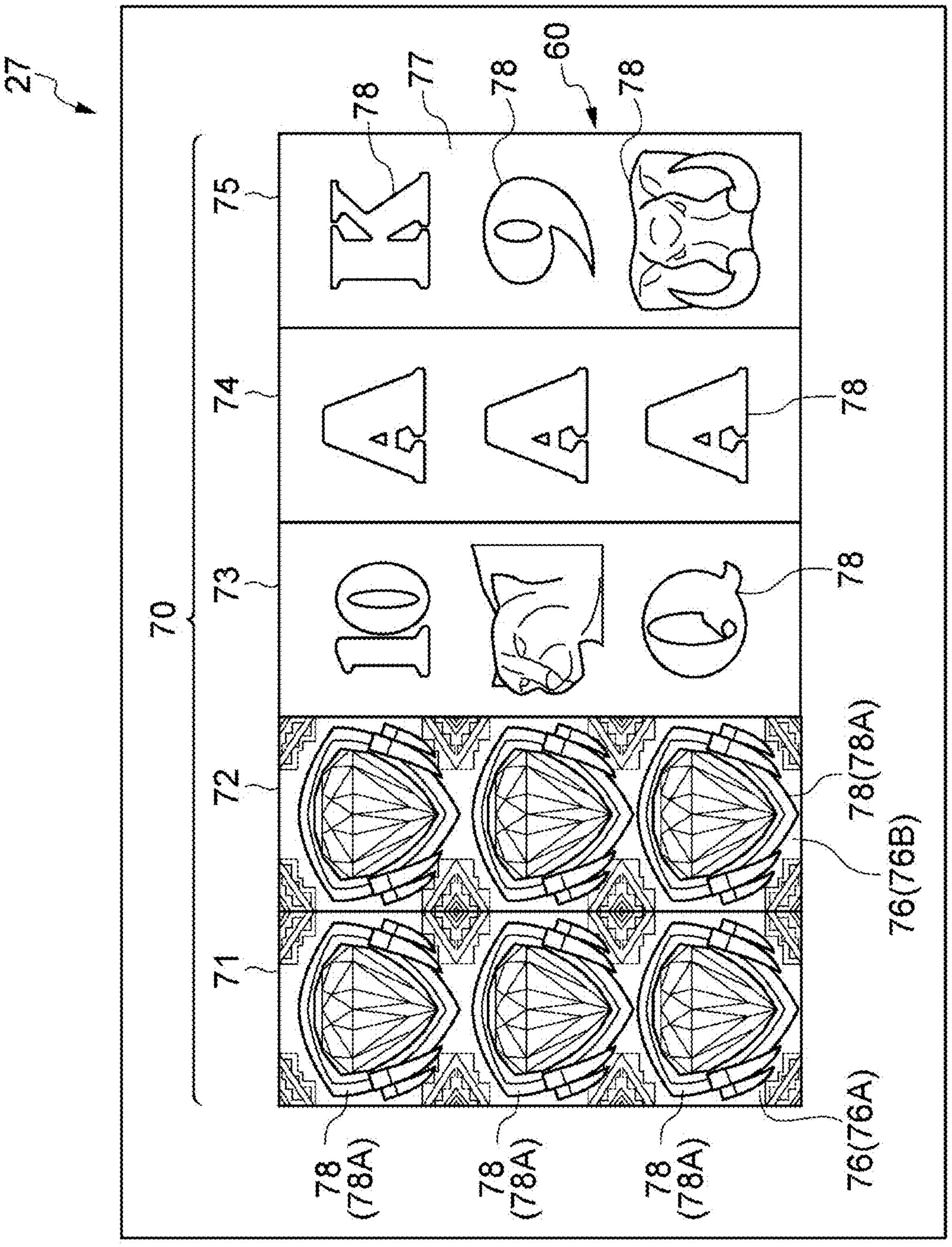
FIG. 12 is a figure showing the state of changing symbols inside the frame on a two-dimensional game screen.

After the frame 76A and 76B is disposed adjacently to the left end, the control unit 50, as shown in FIG. 12, does not rotate the virtual reel strip 71 to 75, the object 78 that shows a symbol inside of each frame 76A and 76B is changed to the object 78A that shows a symbol "Wild (a diamond pattern here)" with a higher rank than a symbol "A" inside the frame 76A. In this way, when determining a win in an order from the left end symbol on the effective line, the displayed frame 76A and 76B is moved to fill the left end of the determination area 60, and inside those frames 76A and 76B, by changing the object 78 with the object 78A, a feeling of expectation for a high payout can be further improved in a special game. Further, when each object before and after being change is distinguished and described below, the object 78 after being changed is described as the object 78A.

Figure 13A:
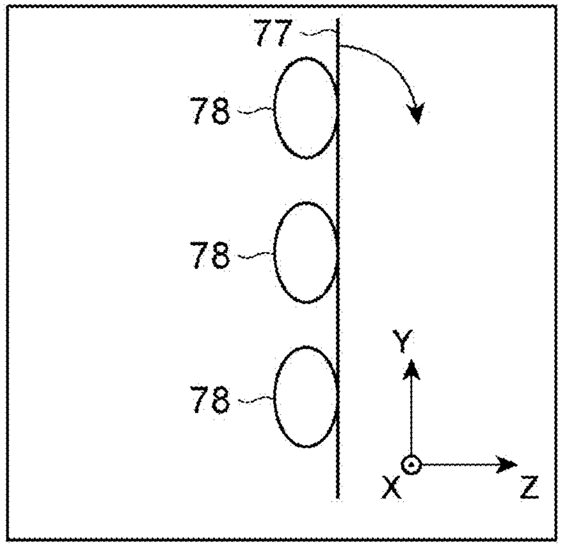
FIGS. 13A-13C is a schematic figure describing the migration process from a two-dimensional game screen to a three-dimensional game screen.
Figure 13B:
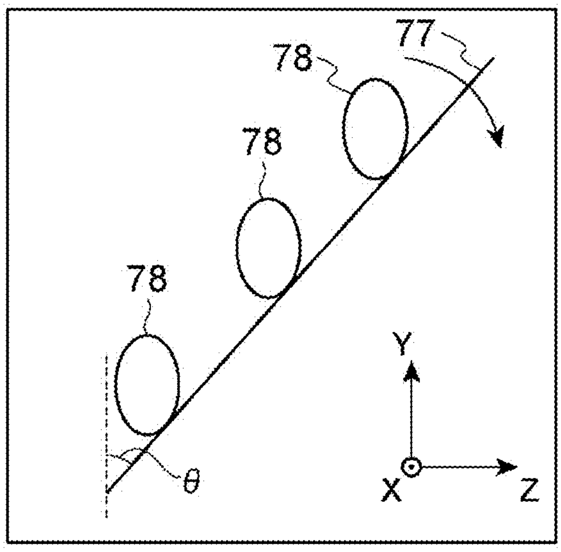
Figure 13C:
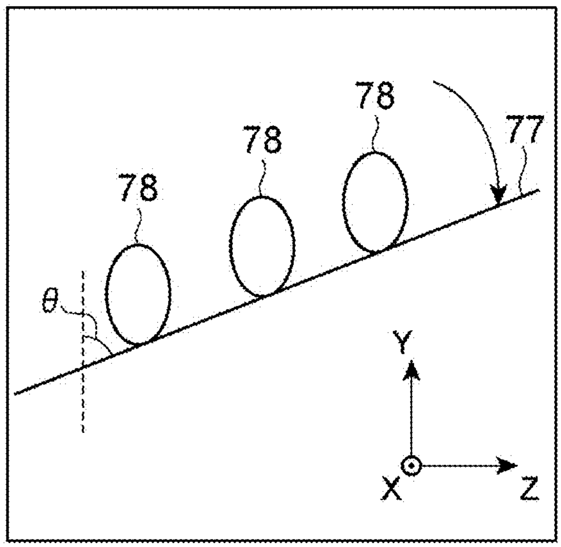

Next, the control unit 50 processes a game screen migrating from a two-dimensional game screen (for example, a screen that provides a regular game) to a three-dimensional game screen (for example, a screen that provides a special game). FIGS. 13A-13C are schematic figures describing the migration process from a two-dimensional game screen to a three-dimensional game screen. A reel surface 77 that includes a determination area 60 in a parallel state on the screen tilts with the object 78 disposed on the reel surface 77 on an X-axis direction as an axis, and the reel surface 77 is shown in a tilted state from a migrating state. Further, for convenience of explanation, the object 78 is shown as a white ellipse.

As shown in FIGS. 13A-13C, the control unit 50 tilts the reel surface 77 in a depth direction of the game screen, and the reel surface 77 stops only when the reel surface 77 is in a tilted position of a predetermined angle θ (0°<θ<90°). In this situation, regardless of the angle of the reel surface 77, the object 78 maintains an angle facing the screen direction (-Z-axis direction) of the display unit 27. Further, when the reel surface 77 is tilted, the reel surface 77 and the object 78 are displayed while reducing and corresponding to the perspective drawing method according to a position in their respective depth directions. In this way, by tilting the reel surface 77 in a depth direction of the game screen, continuity of the screen display is preserved when migrating from a two-dimensional game screen to a three-dimensional game screen, and a smooth screen display migration is carried out without an uncomfortable feeling for the player. Furthermore, by transitioning the screen in this way, the player can easily understand when there is a special game state.

FIG. 14 to FIG. 18 are figures showing a screen transition in a three-dimensional game screen (a game screen in a special game). As shown in FIG. 14 to FIG. 18, the determination area 60 displays the column in a state extending in a depth direction of a game screen in a three-dimensional screen. The control unit 50 displays the object 78 that shows a symbol on the display unit 27 inside a virtual three-dimensional space where a column of the determination area 60 extends in a depth direction of the game screen. The control unit 50 moves and stops a plurality of objects 78 along a direction of a column, aligned so that the column is configured along the plurality of objects 78 in a depth direction.

Figure 14:
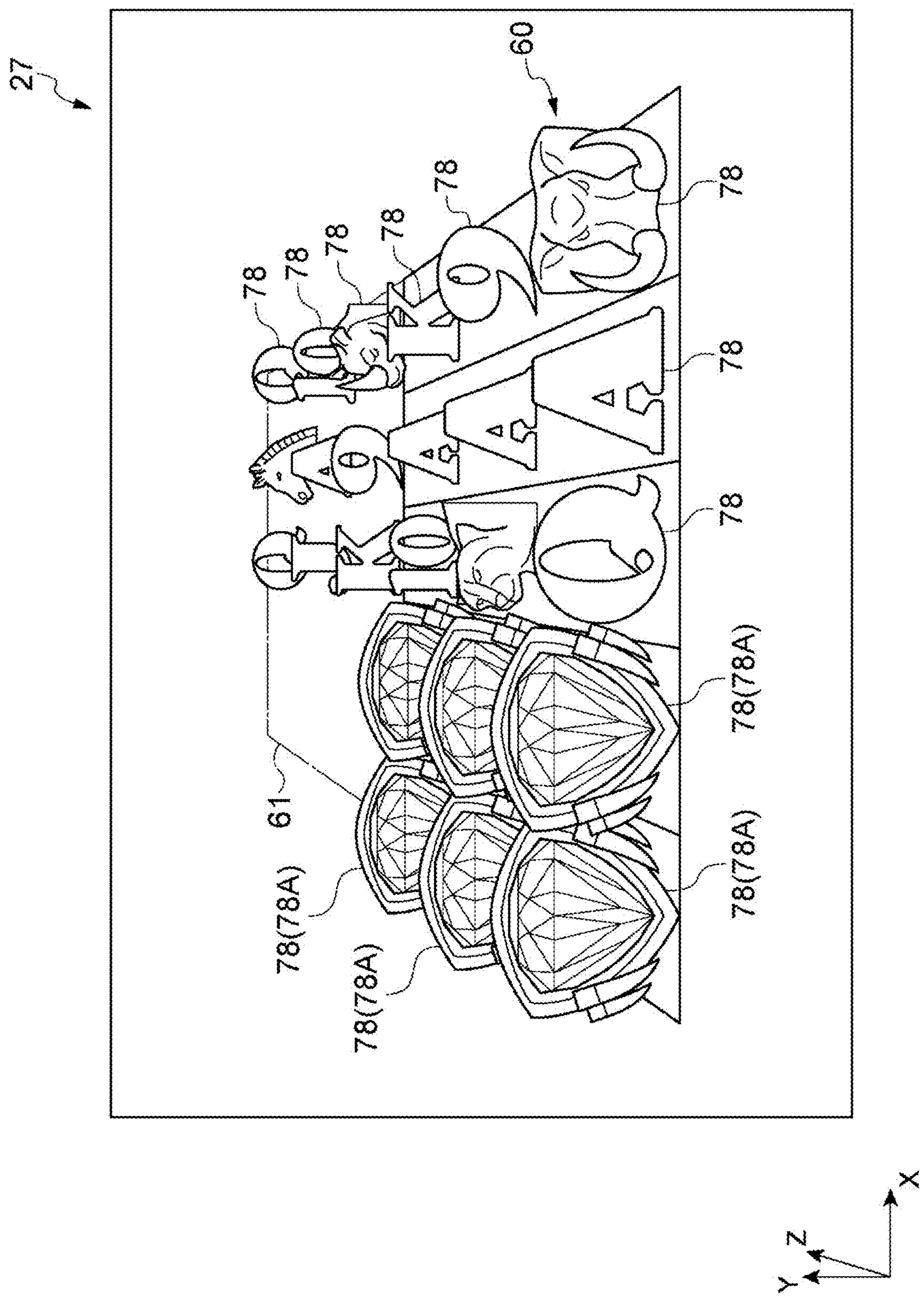
FIG. 14 is a figure showing the state of a completed migration from a two-dimensional game screen to a three-dimensional game screen.

The control unit 50, for example as shown in FIG. 14, aligns a plurality of objects 78 in a depth direction in a non-determination area 61 positioned on the depth side of the determination area 60 and in the determination area 60. The non-determination area 61 is an area outside of the determination area 60 in a virtual three-dimensional space, and an adjacent area of a predetermined range in a depth direction of the determination area 60. In the non-determination area 61 an object 78 that is scheduled to move in the determination area 60 is displayed.

More specifically, the control unit 50, in regards to a column of the object 78 that is not changed by the symbol changing process that uses the frame 76, adds and aligns the object 78 in the non-determination area 61 positioned in a depth direction of the determination area 60 and is aligned in the determination area 60. However, in regards to a column of the object 78A that is changed by the symbol changing process, the object 78A is only aligned inside of the determination area 60 and not aligned in the non-determination area 61 so that it is not moved during the game.

In other words, the control unit 50, in a column other than the column of the object 78A (a column of the object 78 that is not changed by the symbol changing process), on the last (upstream) object 78 aligned in the determination area 60, additionally aligns a plurality of objects 78 that are scheduled to move in the determination area 60 based on the symbol arrangement of the virtual reel strip 71 to 75. In an example of FIG. 14, the control unit 50 aligns three objects 78 along a column direction (depth direction) of the determination area 60, and additionally aligns three objects 78 so that a column is configured in the non-determination area 61 positioned on the depth side of the determination area 60.

Figure 15:
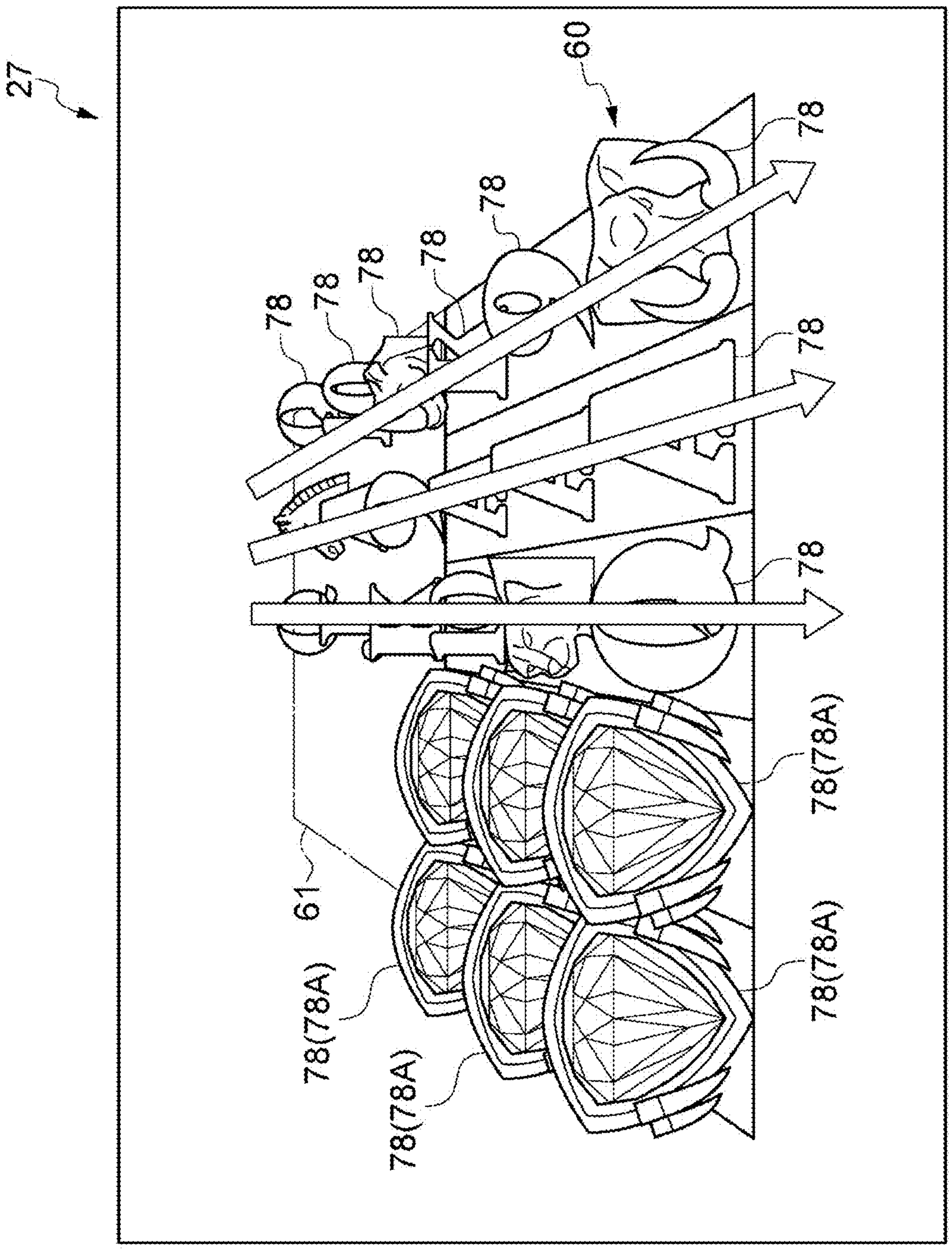
FIG. 15 is a figure showing the state of starting to change objects on a three-dimensional game screen.
Figure 16:
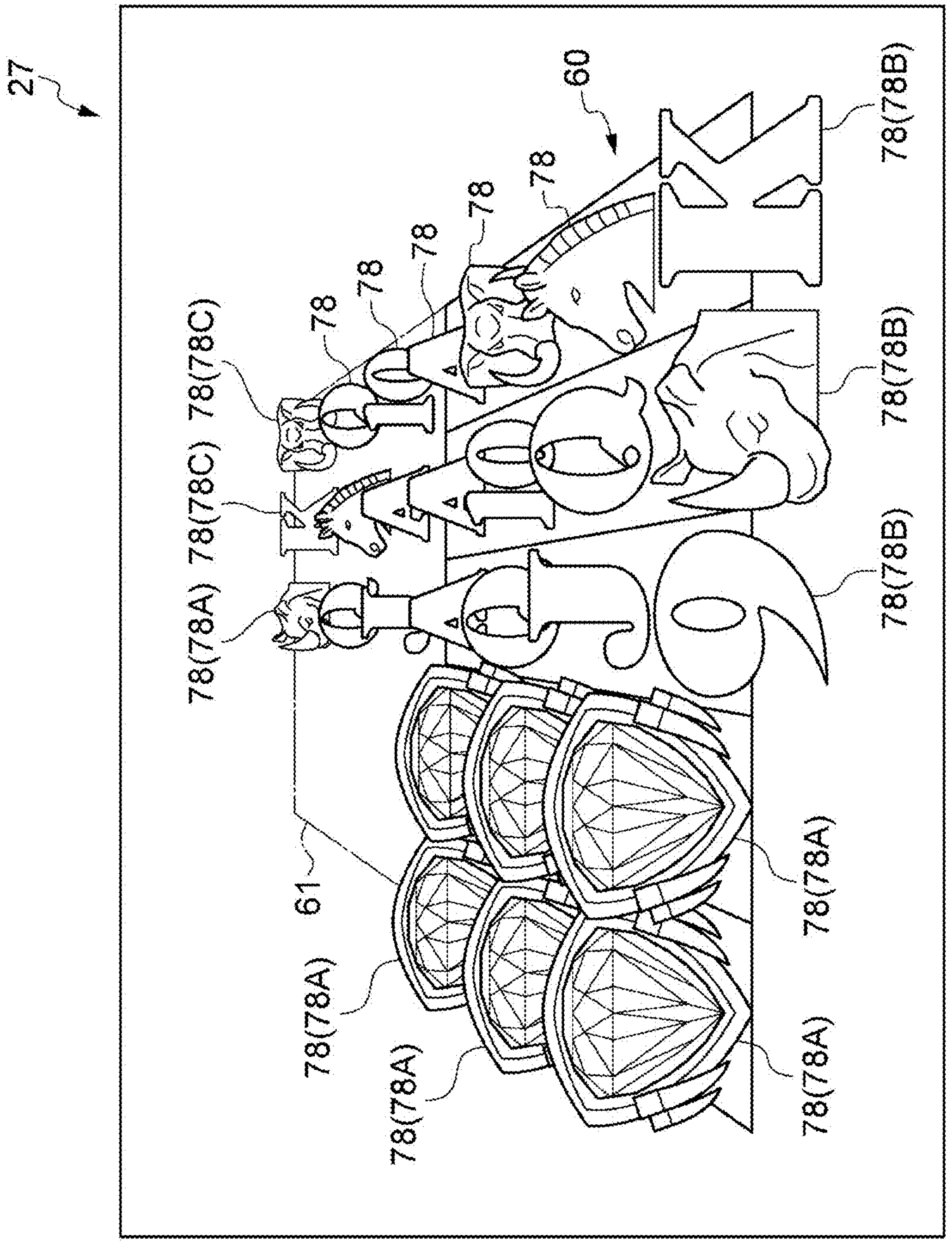
FIG. 16 is a figure showing the state of changing objects on a three-dimensional game screen.

Furthermore, the control unit 50 performs a change of the object 78 in a three-dimensional game screen, to change a symbol, as shown in FIG. 15. In this situation, as shown in FIG. 16, for the object 78 of each column moved to the front side (downstream side) from the depth side (upstream side) of the game screen, the control unit 50 immediately removes the object 78B of the front column (i.e., the front-most row) of the determination area 60 when leaving the determination area 60, and simultaneously adds a new object 78C to the end of the column. That is, the control unit 50 preserves a number of objects 78 in a predetermined number (in this situation, 6 objects) aligned in the determination area 60 and the non-determination area 61, and changes symbols by moving the object 78 so that it is facing the front side from the depth side of the game screen. By this, a visual effect is produced so that it is as if the object 78 follows in succession on the player side, and a powerful visual effect can be produced for unconventional symbol change.

Figure 17:
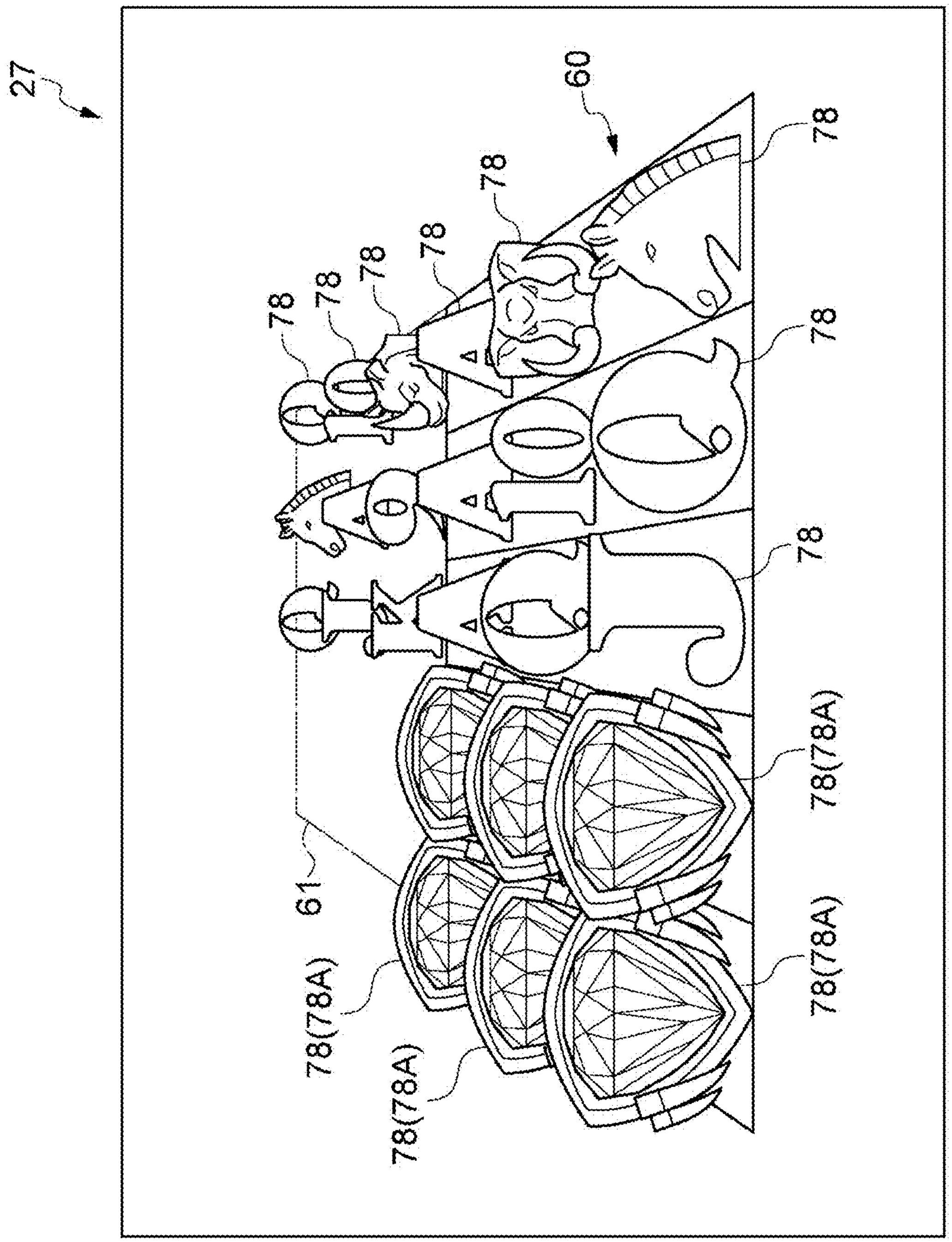
FIG. 17 is a figure showing the state of stopping objects on a three-dimensional game screen.
Figure 18:
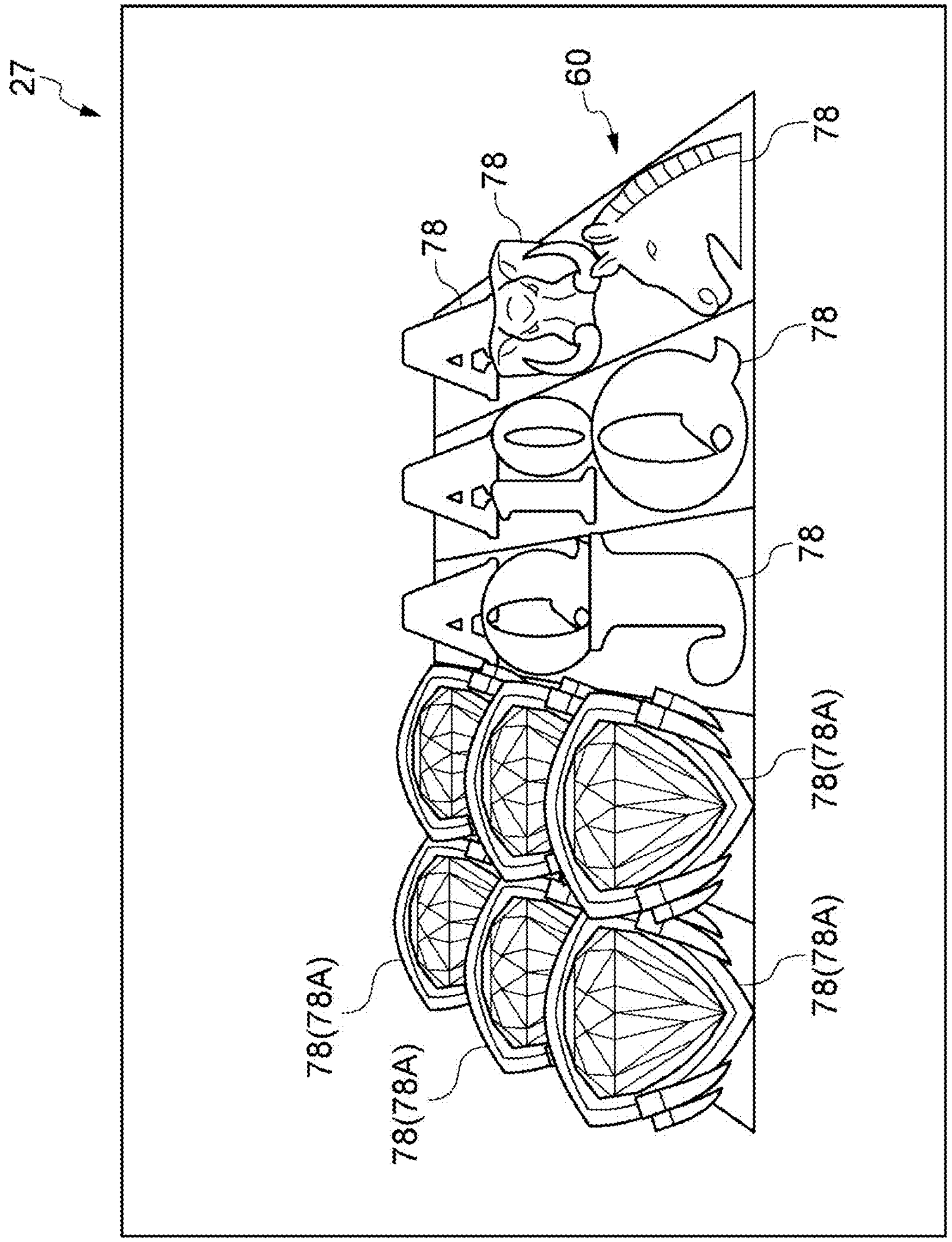
FIG. 18 is a figure showing the state of erased objects inside a non-determination area on a three-dimensional game screen.

Furthermore, as shown in FIG. 17, the control unit 50 determines the stop position randomly for each column except a column with the object 78A, and stops the movement of the object 78 at a determined position. When the object 78 is stopped, as shown in FIG. 18, the control unit 50 removes (does not display) all of the objects 78 aligned in the non-determination area 61. By this, a symbol in the determination area 60, that is, the object 78 can be displayed in a state where the game result is easy to understand for the player, to display only the object 78 relating to the game result.

Further, in FIG. 14-FIG. 18, to improve the visibility of a symbol that enters the determination area 60, the boundary line of the determination area 60 is displayed on the game screen, but this display may be omitted. Further, the boundary line of the virtual reel strip 71 to 75 is similar, and may be displayed on a game screen in a state where the player can understand through a visual, and this display may be omitted.

Next, the control unit 50 carries out the migration process from a three-dimensional game screen to a two-dimensional game screen. FIG. 19 is a schematic figure describing the migration process from a three-dimensional game screen to a two-dimensional game screen. In FIG. 19, a reel surface 77 that includes a determination area 60 in an inclined state against the screen tilts with the object 78 disposed on the reel surface 77 on an X-axis direction as an axis, and the reel surface 77 is shown in a parallel state on the screen from a migrating state. Further, in FIG. 19, for convenience of explanation, the object 78 is shown as a white ellipse.

Figure 19A:
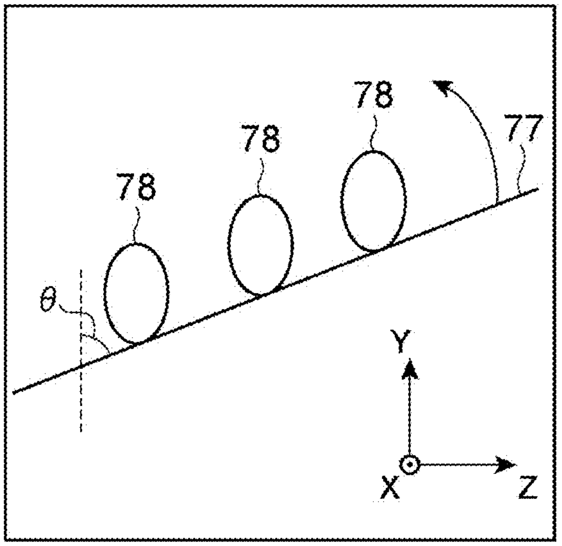
FIGS. 19A-19C is a schematic figure describing the migration process from a three-dimensional game screen to a two-dimensional game screen.
Figure 19B:
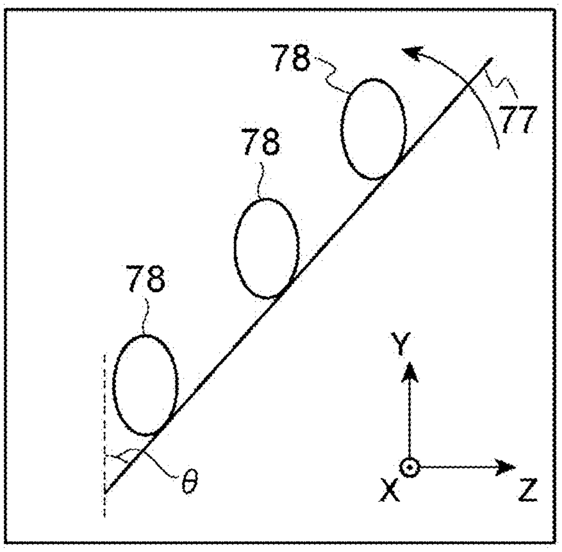
Figure 19C:
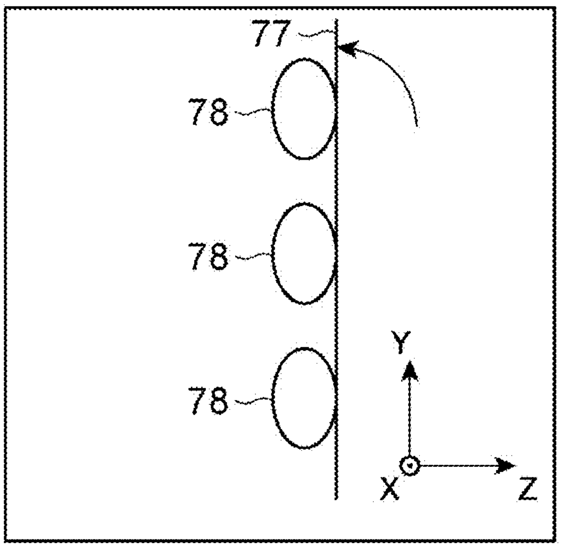

As shown in FIGS. 19A-19C, the control unit 50 returns the reel surface 77 to the previous state, in a reverse procedure of (a)-(c) of FIGS. 13A-13C. That is, the control unit 50 raises the stopped reel surface 77 to the front side in an inclined position of a predetermined angle θ (0°<θ<90°) from a depth direction of the game screen, and the reel surface 77 returns to a flat state against the game screen. In this situation, the object 78 maintains the angle facing a screen direction (-Z-axis direction) of the display unit 27, and when the reel surface 77 is tilted, the reel surface 77 and the object 78 are displayed while expanding and corresponding to the perspective drawing method according to a position in their respective depth directions. In this way, by raising the reel surface 77 to the front side from a depth direction of the game screen, continuity of the screen display is preserved when migrating from a three-dimensional game screen to a two-dimensional game screen, and a smooth screen display migration is carried out without an uncomfortable feeling for the player.

Figure 20:
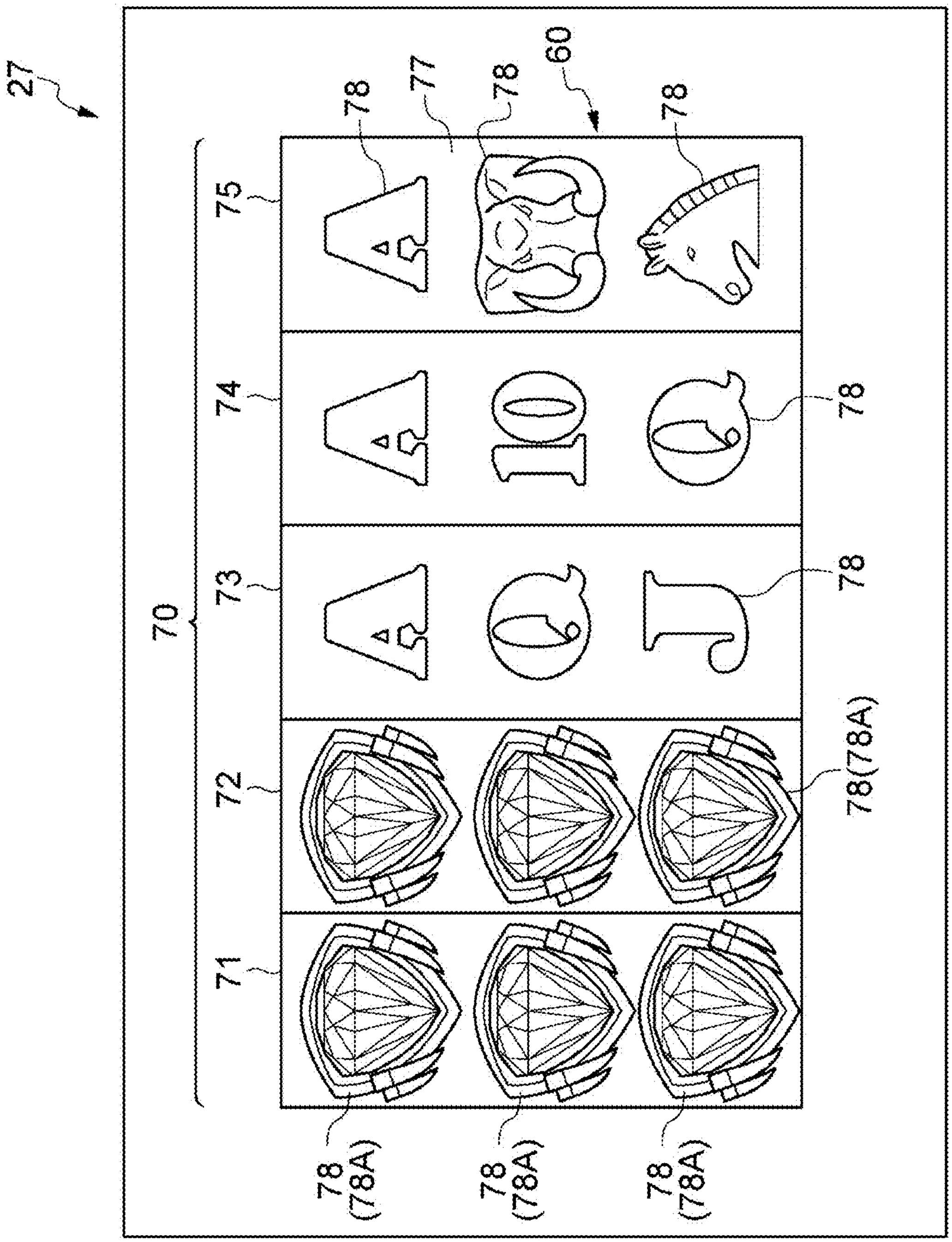
FIG. 20 is a figure showing the state of a completed migration from a three-dimensional game screen to a two-dimensional game screen.

Furthermore, as shown in FIG. 20, the control unit 50 displays the object 78 that shows a symbol in the determination area 60 of a two-dimensional game screen, and a winning result is displayed. In this way, by displaying a winning result on the two-dimensional game screen, the positional relation of a plurality of objects 78 can be displayed clearly, and a winning result can be displayed in a state that is easily visible to the player. When a winning result is displayed, the control unit 50 may highlight (flicker, expand, line display, blur display and the like) a symbol configured of a winning combination. By this, the player can easily understand the symbol that determines a win. When three-dimensional CG on a three-dimensional game screen is used as an object, the control unit 50 may change the object to two-dimensional CG at this stage. In this way, by changing to two-dimensional CG, a winning result can be displayed in a state that is easier to visualize.

Figure 21:
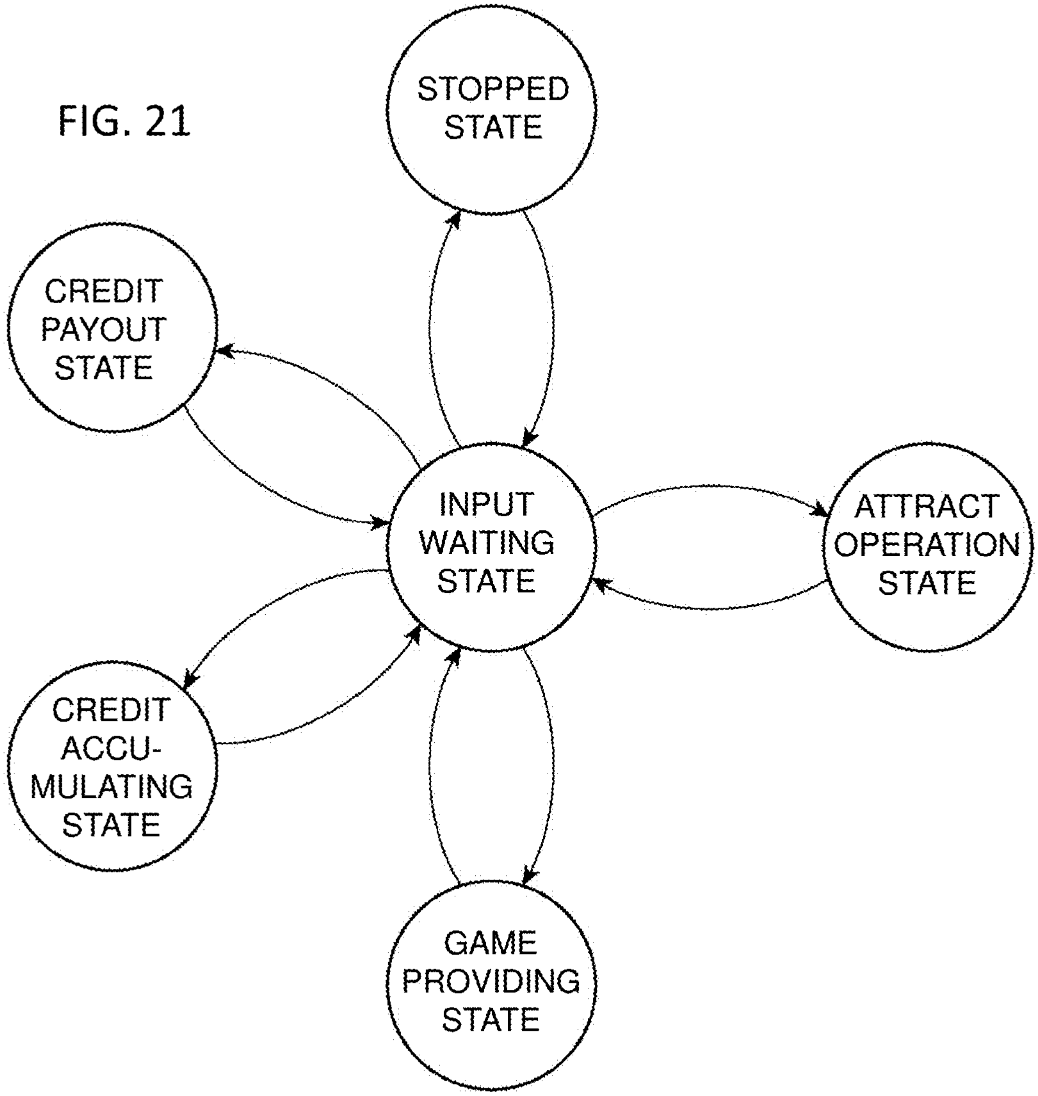
FIG. 21 is a state transition diagram for the gaming machine in FIG. 1.

Next, the operation of the gaming machine 1 according to the present embodiment is described referencing FIG. 21. FIG. 21 shows a state transition diagram of the gaming machine 1 according to the present embodiment configured above. As shown in FIG. 21, the gaming machine 1 takes each state of a game providing states including a stopped state, an input waiting state, a credit payout state, a credit accumulation state, and an attract operation state. Each state is described below.

The stopped state is a state where the gaming machine 1 is not started. The gaming machine 1 in the stopped state started and is initialized when a predetermined start operation is received, a predetermined program is executed by the control unit 50, the game screen is displayed on the lower display 26, which became the input waiting state.

When the bill/ticket identification unit 55 identifies a bill or credit, the gaming machine 1 in the input waiting state switches to a credit accumulation state accumulating information of the corresponding credit inside of the gaming machine 1, and when the accumulation of credits ends, returns to the input waiting state. Further, when the operation of the payout button is received in a state where the information of credits is accumulated, the gaming machine 1 in the input waiting state switches to a credit payout state carrying out payout processing of the accumulated credit, and along with outputting a ticket with printed information corresponding to the credit payout processing from the printer unit 56, the credits accumulated in the gaming machine 1 returns to zero. The gaming machine 1 returns to the input waiting state when these processes finished.

When not operated for a predetermined time, the gaming machine 1 in the input waiting state switches to the attract operation state that displays an attract screen on the upper display 21 and the lower display 26. The gaming machine 1 in an attract operation state returns to the input waiting state when receiving some operation. Further, an attract screen is a screen that appeals the existence of the gaming machine 1 to the customer, and is composed of a predetermined image and/or a video.

The gaming machine 1 in the input waiting state set the bet number and the line number of the game by receiving an operation from the max bet button, or the bet number selection button, the line selection button when a credit is in an accumulated state inside, and by receiving the operation of a start button, is switched to the game providing state along with reducing the credit amount by only the set line number times the credit amount. In the game providing state, a game is provided according to the flowchart shown in FIG. 22 and FIG. 23. The game providing state may be switched according to an operation by the bet number selection button or the max bet button.

Figure 22:
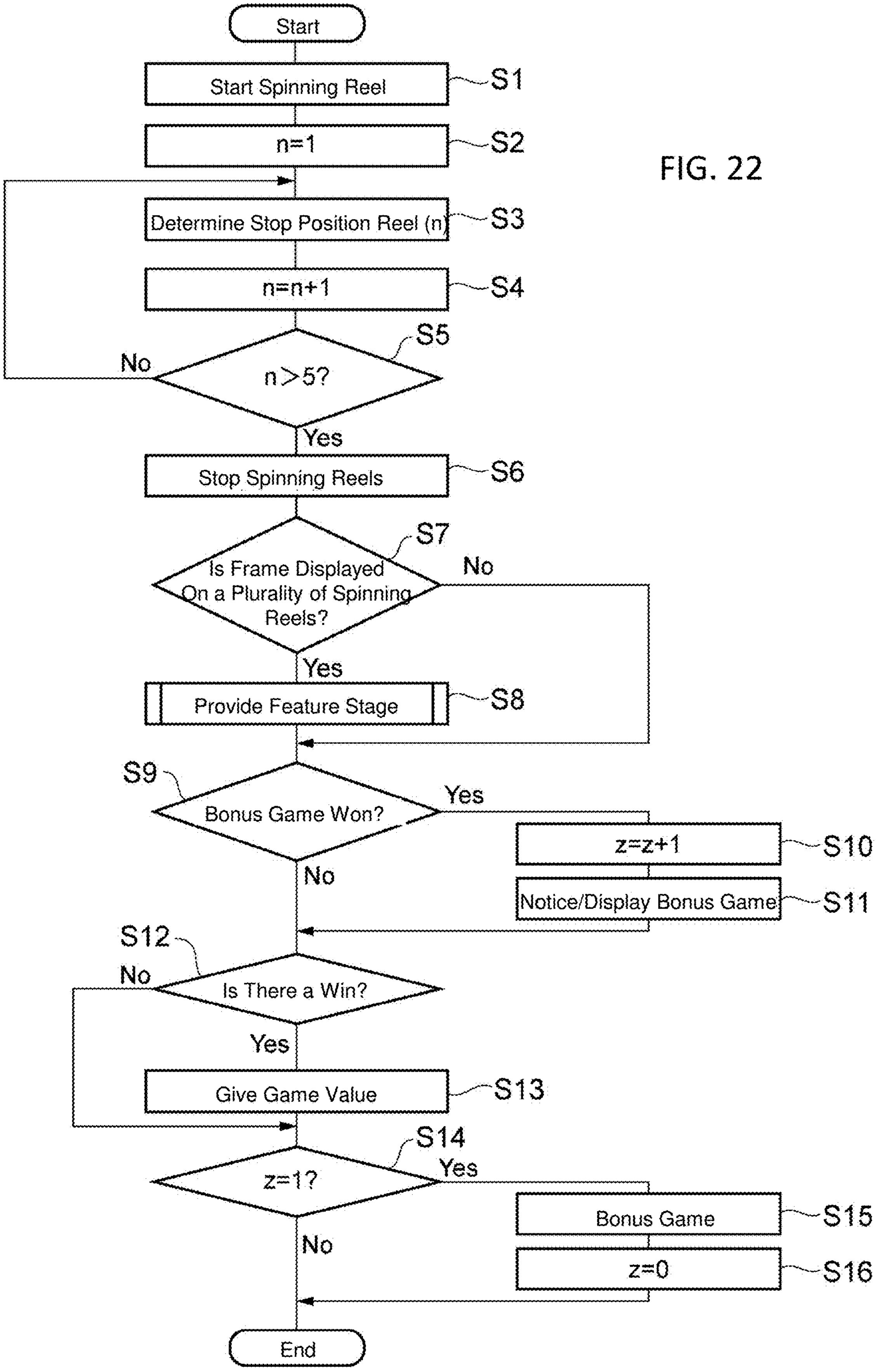
FIG. 22 is a flow chart describing the operation of the gaming machine in FIG. 1.

Operation in a game providing state is described below referencing the flowchart shown in FIG. 22 and FIG. 23 as the control method of the gaming machine 1.

The line number and bet number are set in the input waiting state, the gaming machine 1 that switches to a game providing state by receiving an operation from the start button, starts a regular game by controlling the upper display 21 and the lower display 26 by the control unit 50.

First, in the process of S1, the control unit 50 starts a spin of reel (1)-reel (5) displayed in the determination area 60. More specifically, the control unit 50 scrolls the column of the symbol displayed in the two-dimensional determination area 60 in a vertical direction (downward direction) of the display unit 27 in an order regulated by the respective corresponding virtual reel strips 71 to 75, and the reel and the symbol are shown virtually in a rotating state. Next in the process of S2, the control unit 50 sets the parameter, n=1, as the initial process.

Next, in the process of S3, the control unit 50 acquires a random number, and determines the stop position of the reel (n) based on the acquired random number. The method for the control unit 50 acquiring a random number may be according to the regulation of the area where the gaming machine 1 is installed, and is not limited to the specified method. Here, the stop position of the reel (n) corresponds to the stop position of the corresponding virtual reel strips 71 to 75. Therefore, the stop position, for example, associates and regulates each numeric value or numeric value range of a symbol of the virtual reel strips 71 to 75, and a numerical value including an acquired random number or a numeric value range can be determined as the position of an associated symbol. In this situation, by non-uniformly regulating the numerical value associated with each symbol or a numeric value range, a slope or a deviation can be provided in a probable stop position. After determining the stop position of the reel (n), the process continues to S4.

In the process of S4, the control unit 50 sets n=n+1. After setting, the process continues to S5. In the process of S5, the control unit 50 determines whether n>5 is satisfied. When n>5 is not satisfied, the process continues to S3. By this, the processes of S3-S4 are repeatedly executed until satisfying n>5. By this, the stop positions of reels (1) to reel (5) are determined. When n>5 is satisfied in S5, the process continues to S6, to provide meaning for determining the stop positions of all the reels, reel (1) to reel (5).

In the process S6, the control unit 50 stops the reel (1)-reel (5), based on the stop position of each virtual reel strip 71 to 75 determined in the process of S3. More specifically, the column of a symbol displayed scrolling in the determination area 60 is stopped in a determined stop position for each virtual reel strip 71 to 75.

In the process of S7 that continues from the process of S6, the control unit 50 determines whether a plurality of frames 76 satisfied reel display conditions as predetermined conditions. The reel display conditions are, as mentioned above, for example conditions where two or more frames 76 are displayed inside the determination area 60. When it is determined that the frame 76 is not displayed in a plurality of reels (S7; No) the process continues to S9. However, when it is decided that the frame 76 is displayed in a plurality of reels (S7; Yes), the process continues to the feature stage of S8. Further, the process of S8 is described in detail below.

When the process continues to S9 after the process of S7, in the process of S9, the control unit 50 determines whether the symbol displayed in the determination area 60 satisfies the predetermined conditions providing a bonus game. As for winning conditions in a bonus game, arranging a winning combination of set symbols on a pay line (line determination), and/or the appearance of a special symbol (scatter symbol) of a predetermined number or more inside the determination area 60 (scatter determination) can be given as examples.

When it is determined that the predetermined conditions that provide a bonus game are satisfied in the process of S9, the flag Z provides a bonus game set Z=Z+1 in the process of S10. After the flag is set in the process of S10, provision of the bonus game is displayed as a notice on the upper display 21 and/or the lower display 26 in the process of S11.

In a situation where it is determined that the set conditions providing a bonus game in the process of S9 are satisfied after the process of S11, when the predetermined conditions are not determined as being satisfied after the process of S9, the control unit 50 determines whether the symbols displayed in the determination area 60 include a win combination in the process of S12. For example, the line determination and/or the scatter determination applies separate conditions from the set conditions for providing a bonus game, and determines whether there is a win combination.

When a win combination is determined, in the process of S13, a payout that is a predetermined game value (credit) according to a procedure mentioned below is calculated, and so the calculated payout is given to the player, a credit that corresponds to that payout is added to the credit accumulated in the gaming machine 1.

When a win combination is determined in the process of S12 after the process of S13, and when a win combination is not determined after the process of S12, next it is determined whether the flag Z is set as Z=1 in the process of S14, and when it is determined that it is set as Z=1, the process continues to S15, and the control unit 50 provides a bonus game. In the present embodiment, a free game that does not consume game value is provided a predetermined number of times as a bonus game. During the free game, instead of providing a bonus game when the predetermined conditions are satisfied, the process that adds the correction for adding the number of free games and the like is continued when separate predetermined conditions are satisfied.

When a predetermined number of free games ends, the flag Z is reset to Z=0 and the process of S16 continues from the process of S15, the gaming machine 1 ends the game providing state, and returns to the input waiting state. Further, when it is determined that the flag Z is not set to Z=1 in the process of S14, the gaming machine 1 ends the game providing state, and returns to the input waiting state. The operation ends in the game providing state above.

Figure 23:
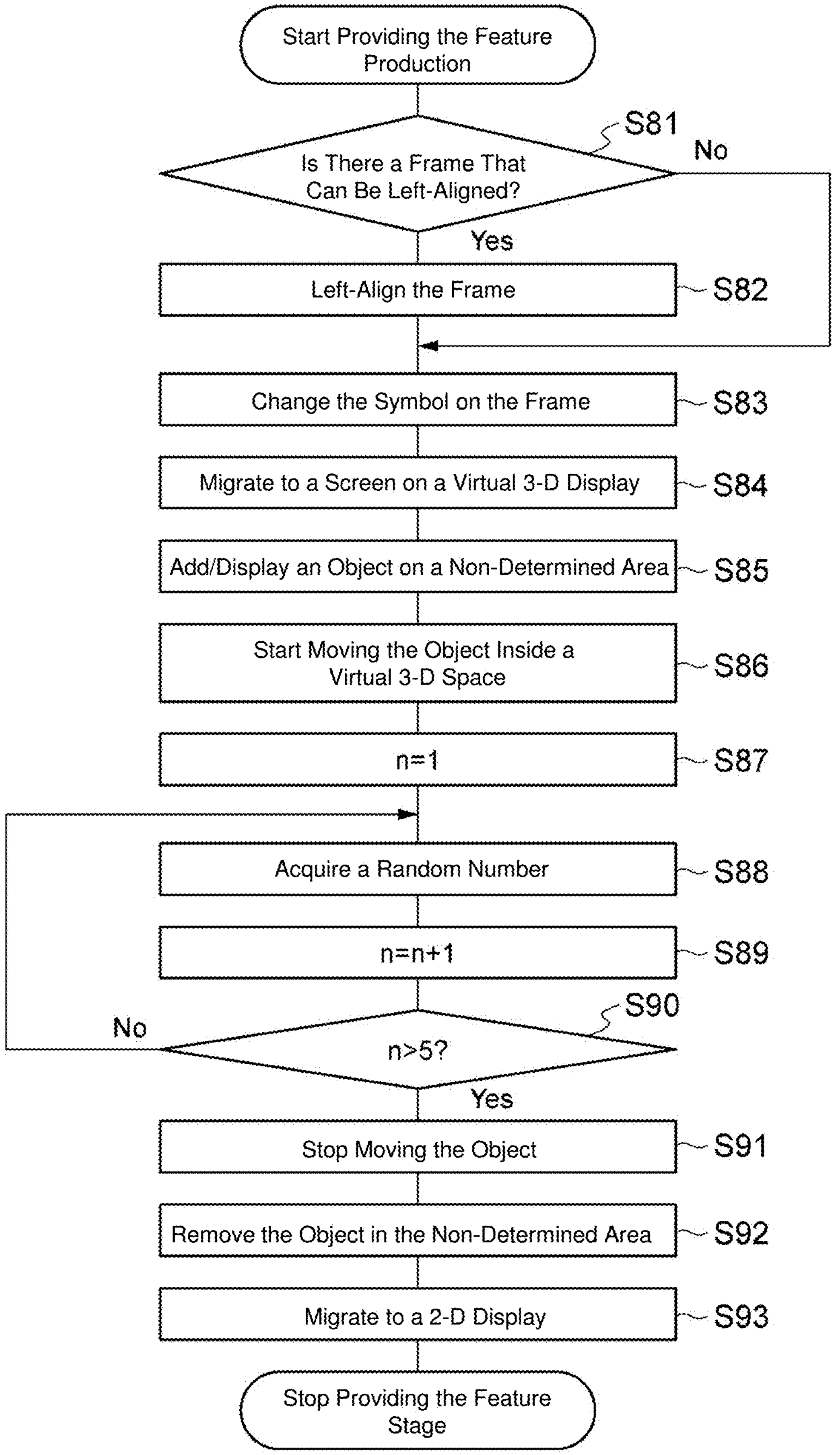
FIG. 23 is a flow chart describing the process of S8 in FIG. 21.

Here, the process of S8 is described in detail referencing FIG. 23, when the process of providing a feature stage of S8 after the process of S7 continues.

When a feature stage starts being provided, first, the control unit 50 determines whether the frame 76 that can be left-aligned exists in the process of S81. When the frame 76 that can be left-aligned is determined to exist (S81; Yes), the process continues to S82, and after aligning the frame 76 to the left (S82), the process continues to S83. When the frame 76 that can be left-aligned is determined to not exist (S81; No), the frame 76 is not aligned to the left, and the process continues to S83.

In the process of S83, the control unit 50 changes the symbol inside the frame 76, and upgrades the rank of the symbol inside the frame 76. When the symbol finishes being ranked up, the process continues to S84, and the control unit 50 migrates from a two-dimensional game screen to a three-dimensional game screen. When the display of the game screen finishes migrating, the process continues to S85, the control unit 50 adds the object 78 that shows a symbol in the non-determination area 61, in a column except for a column of the object 78A that shows a symbol after changing. By this, the object 78 that shows a symbol is aligned in both the determination area 60 and the non-determination area 61, in a column except for a column of object 78A on a game screen (reference FIG. 14).

After the object 78 is aligned in the determination area 60 and the non-determination area 61, the process continues to S86, the control unit 50 starts to move the object 78 of a column except a column of the object 78A that is fixed and displayed, within the reels (1)-(5), inside of a virtual three-dimensional space. More specifically, the control unit 50 scrolls a column of the object 78 aligned in the determination area 60 and the non-determination area 61 in an order regulated by the virtual reel strip 71 to 75 corresponding respectively (reference FIG. 15). Next in the process of S87, the control unit 50 sets the parameter, n=1, as the initial process. Further, as shown in FIG. 15, when a column of the fixed and displayed object 78A exists, an initial value may be given to determine the stop position of a reel (3) to a reel (5) corresponding to a column except a column of the object 78A. In this situation, in the process of S87, the control unit 50 sets the parameter, n=3, as the initial process.

Next in the process of S88, the control unit 50 acquires a random number, and determines the stop position of the reel (n) based on the acquired random number. The method for the control unit 50 acquiring a random number may be according to the regulation of the area where the gaming machine 1 is installed, and is not limited to the specified method. After determining the stop position of a column of the object 78 corresponding to the reel (n), the process continues to S89.

In the process of S89, the control unit 50 sets n=n+1. After setting, the process continues to S90. In the process of S90, the control unit 50 determines whether n>5 is satisfied. When n>5 is not satisfied, the process continues to S88. By this, the processes of S88-S89 are repeatedly executed until satisfying n>5. By this, the stop positions of the reels are determined. When n>5 is satisfied in S90, the process continues to S91, to provide meaning for determining the stop positions of all the reels.

In the process S91, the control unit 50 stops the reels, according to a column except a column of the fixed and displayed object 78A, based on the stop position of each virtual reel strip determined in the process of S88. More specifically, a column of the object 78 displayed scrolling in the determination area 60 is stopped in a determined stop position for each virtual reel strip.

In the process of S92 continuing from the process of S91, the control unit 50 removes an object aligned in the non-determination area 61, and the process continues to S93. In S93, the control unit 50 carries out a migration process from a three-dimensional game screen to a two-dimensional game screen, displays the game result, and ends the game providing process by the feature stage.

Next, is a description of a program of the gaming machine 1 for operating one or a plurality of computers as the control unit 50. The gaming machine 1 stores the program in the memory, and can execute the program. The gaming machine 1 can access the program stored in the memory and can operate as the gaming machine 1 of the present embodiment by the program.

Further, the program according to the embodiment may be provided through a network or stored in a recording medium. Recording media such as a floppy (registered trademark) disk, CD-ROM, DVD, or ROM and the like, or semiconductor memory and the like are exemplified as a recording medium. In this case, a program stored in the memory uses a reading device inside the gaming machine 1 such as a floppy (registered trademark) disk drive device, CD-ROM drive device, and DVD drive device and the like.

In the described gaming machine 1, the control method of the gaming machine 1, and the program of the gaming machine 1, a game is provided in a state displaying the object 78 that shows a symbol in a virtual three-dimensional space on the display unit 27. Furthermore, the plurality of objects 78 expressed in a display image in the display unit 27 are aligned along in a depth direction of the determination area 60 and the non-determination area 61, and a column of the aligned object 78 is moved to the front side in an aligned state. By this, a visual effect is produced so that it is as if the object 78 follows in succession on the player side, and a powerful visual effect can be produced for an unconventional symbol change. Furthermore, because the object 78 that shows a symbol is aligned in not only the determination area 60 but also on the depth side of the non-determination area 61, the symbol displayed in the determination area 60 can be noticeably displayed. That is, a symbol that would soon move to the determination area 60 is displayed before in the non-determination area 61 on the depth side of the determination area 60, and the state moving from the non-determination area 61 to the determination area 60 can be visible to the player. In this way, a process of a symbol relating to a win until being displayed in the determination area 60 can be explicitly indicated to the player, and the joy of the player when winning can be increased. Similarly, a feeling of nearly-missing a win, when a win is missed, could also be given to the player.

The control unit 50 in this type of gaming machine 1, displays an object 78 that shows a symbol inside of a two-dimensional plane in a two-dimensional game screen on the display unit 27, after changing and stopping a plurality of symbols in a three-dimensional game screen. By this, there could be a state where a confirmation of a payout can be easily carried out displaying a stopped symbol inside a highly visible two-dimensional plane, and a symbol change is displayed inside a powerful virtual three-dimensional space.

Further, the control unit 50 displays the object 78 that shows a symbol inside a two-dimensional plane on the display unit 27, changes a plurality of symbols by moving the plurality of objects 78, and when predetermined conditions are satisfied, displays the object 78 that shows a symbol inside of a virtual three-dimensional space that extends a column of the determination area 60 in a depth direction on the display unit 27. For this, when predetermined conditions are satisfied, the screen displayed in the display unit 27, changes from a two-dimensional game screen to a three-dimensional game screen. By this, the player can be informed of the satisfied predetermined conditions in a powerful state of a three-dimensional game screen, and the feeling of expectation for winning held by the player can be increased.

The first embodiment of the present invention is described above, but the present invention is not limited to such an embodiment, a variety of variations are possible.

For example, in such an embodiment, when migrating from a two-dimensional game screen to a three-dimensional game screen, frame display conditions may be used as the predetermined conditions determined by the control unit 50, but the predetermined conditions are not limited to this. For example, conditions based on a random number appropriately generated may be used.

In such an embodiment, a situation where a migration from a two-dimensional game screen to a three-dimensional game screen is described when predetermined conditions are satisfied during a regular game in a two-dimensional game screen, but this is not limited thereto, and for example, a regular game may be executed on a three-dimensional game screen.

In such an embodiment, a gaming machine providing a game in the form of a slot machine is described, but this is not limited thereto, and a game in the state of poker, a video card game called black jack, bingo, keno, a wheel game and the like may be provided. Further, it is possible to apply the present invention to a pachinko machine or a pachinko slot machine.

Referring to FIG. 1, in one embodiment, referring to FIG. 1, the control panel 41 includes a plurality of user input devices that may include an acceptor device which accepts media associated with a monetary value to establish a credit balance, a validator configured to identify the physical media, a cash-out button actuatable to cause an initiation of a payout associated with the credit balance. The acceptor device may include a touchscreen display associated with the display unit 27 and/or the player tracking unit 57, the paper money/ticket identification unit 42, the operation unit 44, the player tracking unit 57, a coin slot, a ticket in ticket out (TITO) system, a bill acceptor, and/or any suitable device that enables the gaming machine 1 to receive media associated with a monetary value and establish a credit balance for use in playing the gaming machine. In one embodiment, the acceptor device may be configured to receive physical media such as, for example, a coin, a medal, a ticket, a card, a boll, currency, and/or any suitable physical media that enables the gaming machine 1 to function as described herein. The acceptor device may also be configured to accept virtual media such as, for example, a player tracking account, a virtual credit balance, reward points, gaming credits, bonus points, and/or any suitable virtual media that enables the gaming machine 1 to function as described herein. For example, in one embodiment, the coin slot may include an opening that is configured to receive coins and/or tokens deposited by the player into the gaming machine 1. The control unit 50 converts a value of the coins and/or tokens to a corresponding amount of gaming credits that are used by the player to wager on games played on the gaming machine 1. The bill acceptor may include an input and output device that is configured to accept a bill, a ticket, and/or a cash card into the bill acceptor to enable an amount of gaming credits associated with a monetary value of the bills, ticket, and/or cash card to be credited to the gaming machine 1. In one embodiment, the bill acceptor also includes a printer (not shown) that is configured to dispense a printed voucher ticket that includes information indicative of an amount of credits and/or money paid out to the player by the gaming machine 1 during a gaming session. The voucher ticket may be used at other gaming devices, or redeemed for cash, and/or other items as part of a casino cashless system.

In the embodiment, determining the stop position of each reel is described as consecutively acquiring a random number that is used respectively, but the acquisition procedure of the random number is not limited to this. For example, when the game starts, the control unit 50 acquires these random numbers in a batch, and each random number may be stored in the storage area of the non-erasing memory 53 or the storage 54 when power failure occurs. In this type of situation, even when a power failure and the like occurs during a game, because the control unit 50 acquired the random number from the memory 53 or the storage 54 when the game started before the power failure occurred, when resuming the game after recovering from a power failure, the progress of the game can be reproduced. For example, when a game result obtaining a high payout is formed right before a power failure occurs, the player will be greatly dissatisfied if the progress of the game is not similar after recovering from a power failure. However, as mentioned above when the game starts all of the random numbers are acquired in a batch, and by saving these random numbers in the memory 53 or the storage 54, such great dissatisfaction can be avoided for the player because the progress of a game similar to before a power failure occurred can be reproduced after recovering from a power failure.

Further, in the embodiment, a bill or ticket is displayed as game value, and received by these bill/ticket identification devices, and a form where a ticket is output by a printer unit is described, but the present invention is not limited to this. The game value is a concept including tangible objects such as a coin, bill, coin, medal, ticket, and the like, or electronic data that has a value equivalent to these. For example, a coin is received by the coin accepter, and there may be a form where a coin is paid by a coin hopper. A player is identified and credit that is accumulated in an account on a server is used, there may be a form where credit is paid to an account, information of credit stored in a storage medium of a magnetic card, IC card and the like is read and used, and there may be a form where credit is paid by writing to the storage medium.

Further, in the embodiment when showing a free game provided as a bonus game, a bonus game that uses a different virtual reel strip from a regular game may be provided. Further, there could be a provided a feature game according to a value of the random number acquired during a regular game.

Further, set conditions providing a bonus game are not limited to scatter determination or line determination, for example there may be a configuration providing a bonus game when the bet number surpasses a predetermined value. There could be a configuration providing a bonus game according to a value of the random number acquired during a regular game.

Further, in the embodiment, a form providing a free game for a predetermined number of times as a bonus game is shown, and a bonus game that is not limited to a number of times may be provided. In this situation, there could be a configuration providing a bonus game until an end condition is satisfied, as an end condition is a combination of specified symbols, or a determining bonus game based on a random number.

Further, in the embodiment, each virtual reel strip 71 to 75 has a frame 76, but this is not limited thereto, and there may be a virtual reel strip that does not include a frame 76. In this situation, different predetermined condition providing feature stage, such as combination of predetermined symbols in the game result, random determination or the like may be used.

DESCRIPTION OF REFERENCE NUMERALS

1 gaming machine
27 display unit
44 operation unit
50 control unit
60 determination area
61 non-determination area
76, 76A, 76B frame
78, 78A object

What is claimed is:

1. A gaming machine, comprising:
a cabinet;
a display mounted to the cabinet; and
a control unit including a processor programed to execute an algorithm including the steps of:
displaying a game on the display including a plurality of reels displayed in a two-dimensional game screen;
spinning and stopping the reels to display a first outcome of the game;
animating the plurality of reels from the two-dimensional game screen to a three-dimensional game screen upon detecting a trigger condition by tilting the plurality of reels in a depth direction to a predetermined angle, the three-dimensional game screen including a determination area and a non-determination area, each reel displaying symbols within the determination area and at least one reel displaying symbols within the determination area and the non-determination area;
spinning the least one reel to move associated symbols displayed with the at least one reel through the determination area and the non-determination area; and
stopping the at least one reel to form a second outcome of the game defined by symbols displayed in the determination area.

2. The gaming machine of claim 1, wherein the processor is programmed to execute the algorithm including the steps of:
displaying at least two other reels without symbols displayed in the non-determination area.

3. The gaming machine of claim 2, wherein the processor is programmed to execute the algorithm including the steps of:
holding the at least two other reels in position as the at least one reel spins to move the associated symbols through the determination area and the non-determination area.

4. The gaming machine of claim 3, wherein the processor is programmed to execute the algorithm including the steps of:
replacing each symbol being displayed with the at least two other reels to an identical symbol before spinning the at least one reel.

5. The gaming machine of claim 1, wherein the processor is programmed to execute the algorithm including the steps of:
removing any symbols being displayed in the non-determination area after stopping the at least one reel.

6. The gaming machine of claim 1, wherein the processor is programmed to execute the algorithm including the steps of:
displaying the at least one reel with a first number of symbols in the two-dimensional game screen and a second number of symbols in the three-dimensional game screen that is greater than the first number of symbols.

7. The gaming machine of claim 6, wherein the processor is programmed to execute the algorithm including the steps of:
animating the plurality of reels from the three-dimensional game screen to the two-dimensional game screen after conducting a predefined number of instances of the game with the three-dimensional game screen.

8. The gaming machine of claim 6, wherein the processor is programmed to execute the algorithm including the steps of:
displaying the two-dimensional game screen including the determination area and stopping the at least one reel to form the first outcome of the first instance defined by symbols displayed in the determination area.

9. The gaming machine of claim 8, wherein the processor is programmed to execute the algorithm including the steps of:
displaying the two-dimensional game screen without the non-determination area.

10. A method of operating a gaming machine including a display mounted to a cabinet and a control unit including a processor operably coupled to the display, the method including the processor performing the algorithm steps of:
displaying a game on the display including a plurality of reels displayed in a two-dimensional game screen;
spinning and stopping the reels to display a first outcome of the game;
animating the plurality of reels from the two-dimensional game screen to a three-dimensional game screen upon detecting a trigger condition by tilting the plurality of reels in a depth direction to a predetermined angle, the three-dimensional game screen including a determination area and a non-determination area, each reel displaying symbols within the determination area and at least one reel displaying symbols within the determination area and the non-determination area;

spinning the least one reel to move associated symbols displayed with the at least one reel through the determination area and the non-determination area; and stopping the at least one reel to form a second outcome of the game defined by symbols displayed in the determination area.

11. The method of claim 10, including the processor performing the algorithm steps of:

displaying at least two other reels without symbols displayed in the non-determination area.

12. The method of claim 11, including the processor performing the algorithm steps of:

holding the at least two other reels in position as the at least one reel spins to move the associated symbols through the determination area and the non-determination area.

13. The method of claim 12, including the processor performing the algorithm steps of:

replacing each symbol being displayed with the at least two other reels to an identical symbol before spinning the at least one reel.

14. The method of claim 10, including the processor performing the algorithm steps of:

removing any symbols being displayed in the non-determination area after stopping the at least one reel.

15. The method of claim 10, including the processor performing the algorithm steps of:

displaying the at least one reel with a first number of symbols in the two-dimensional game screen and a second number of symbols in the three-dimensional game screen that is greater than the first number of symbols.

16. The method of claim 15, including the processor performing the algorithm steps of:

animating the plurality of reels from the three-dimensional game screen to the two-dimensional game screen after conducting a predefined number of instances of the game with the three-dimensional game screen.

17. The method of claim 15, including the processor performing the algorithm steps of:

displaying the two-dimensional game screen including the determination area and stopping the at least one reel to form the first outcome of the first instance defined by symbols displayed in the determination area.

18. The method of claim 17, including the processor performing the algorithm steps of:

displaying the two-dimensional game screen without the non-determination area.

19. A non-transitory computer-readable storage media having computer-executable instructions embodied thereon, when executed by at least one processor the computer-executable instructions cause the at least one processor to perform an algorithm including the steps of:

displaying a game on a display including a plurality of reels displayed in a two-dimensional game screen;

spinning and stopping the reels to display a first outcome of the game;

animating the plurality of reels from the two-dimensional game screen to a three-dimensional game screen upon detecting a trigger condition by tilting the plurality of reels in a depth direction to a predetermined angle, the three-dimensional game screen including a determination area and a non-determination area, each reel displaying symbols within the determination area and at least one reel displaying symbols within the determination area and the non-determination area;

spinning the least one reel to move associated symbols displayed with the at least one reel through the determination area and the non-determination area; and stopping the at least one reel to form a second outcome of the game defined by symbols displayed in the determination area.

20. The non-transitory computer-readable storage media of claim 19, wherein the computer-executable instructions cause the at least one processor to perform the algorithm including the steps of:

animating the plurality of reels from the three-dimensional game screen to the two-dimensional game screen after conducting a predefined number of instances of the game with the three-dimensional game screen.

* * * * *